(12) United States Patent
Niemelä et al.

(10) Patent No.: US 11,101,622 B2
(45) Date of Patent: Aug. 24, 2021

(54) CHARGING UNIT FOR A PARTICLE MONITORING APPARATUS, AND A PARTICLE MONITORING APPARATUS

(71) Applicant: Dekati Oy, Kangasala (FI)

(72) Inventors: Ville Niemelä, Kangasala (FI); Leo Holma, Kangasala (FI); Sami Lundahl, Kangasala (FI); Tyler Beck, Vadnais Heights, MN (US)

(73) Assignee: Dekati Oy, Kangasala (FI)

( * ) Notice: Subject to any disclaimer, the term of this patent is extended or adjusted under 35 U.S.C. 154(b) by 348 days.

(21) Appl. No.: 15/771,142

(22) PCT Filed: Oct. 3, 2016

(86) PCT No.: PCT/FI2016/050684
§ 371 (c)(1),
(2) Date: Apr. 26, 2018

(87) PCT Pub. No.: WO2017/072395
PCT Pub. Date: May 4, 2017

(65) Prior Publication Data
US 2018/0331510 A1    Nov. 15, 2018

(30) Foreign Application Priority Data

Oct. 26, 2015 (FI) .................................... 20155760

(51) Int. Cl.
*H01T 19/04*      (2006.01)
*G01M 15/10*    (2006.01)
(Continued)

(52) U.S. Cl.
CPC ............. *H01T 19/04* (2013.01); *G01M 15/10* (2013.01); *G01N 15/0618* (2013.01);
(Continued)

(58) Field of Classification Search
None
See application file for complete search history.

(56) References Cited

U.S. PATENT DOCUMENTS

| 3,114,877 A | 12/1963 | Dunham |
| 3,949,390 A | 4/1976 | Rayl et al. |

(Continued)

FOREIGN PATENT DOCUMENTS

| CN | 85106165 A | 3/1987 |
| CN | 2608984 Y | 3/2004 |

(Continued)

OTHER PUBLICATIONS

National Intellectual Property Administration, P.R. China, First Office Action, Application 201680076346.7, dated Feb. 22, 2019, 6 pages. (English Translation, 8 pages.).

(Continued)

*Primary Examiner* — Jeffrey A Gblende
(74) *Attorney, Agent, or Firm* — Ziegler IP Law Group, LLC

(57) ABSTRACT

A particle measuring apparatus includes
  a charging unit to form charged particles from aerosol particles carried by an input flow, and
  a particle detector to provide an electric current by collecting the charged particles,
wherein the charging unit in turn includes
  a counter-electrode having a substantially hemispherical inner portion to define a charging space,
  an inlet channel for guiding aerosol particles into the charging space,
  a corona electrode to form charged particles from the aerosol particles by generating a corona discharge in the charging space, and (Continued)

an outlet channel for guiding charged particles from the charging space to the detector.

3 Claims, 10 Drawing Sheets

(51) Int. Cl.
  *G01N 15/06* (2006.01)
  *G01N 15/00* (2006.01)
(52) U.S. Cl.
  CPC . *G01N 15/0656* (2013.01); *G01N 2015/0038* (2013.01); *G01N 2015/0046* (2013.01)

(56) References Cited

U.S. PATENT DOCUMENTS

| | | | |
|---|---|---|---|
| 6,228,149 | B1 | 5/2001 | Alenichev et al. |
| 6,502,450 | B1 | 1/2003 | Patashnick et al. |
| 7,174,767 | B2* | 2/2007 | Booker ............... G01G 3/13 73/24.01 |
| 9,764,333 | B2 | 9/2017 | Dick et al. |
| 9,791,360 | B2 | 10/2017 | Niemela et al. |
| 9,791,361 | B2 | 10/2017 | Niemala et al. |
| 2006/0150754 | A1* | 7/2006 | Burtscher ........ G01N 15/0656 73/865.5 |
| 2006/0156791 | A1* | 7/2006 | Tikkanen ............ G01N 27/62 73/23.31 |
| 2010/0001184 | A1 | 1/2010 | Chen et al. |
| 2011/0072786 | A1 | 3/2011 | Tokuda et al. |
| 2011/0120096 | A1 | 5/2011 | Nakamura |
| 2011/0220811 | A1 | 9/2011 | Dick et al. |
| 2012/0048792 | A1* | 3/2012 | Saitou ................. F24F 3/1423 210/243 |
| 2012/0180659 | A1 | 7/2012 | Laitinen et al. |
| 2013/0141041 | A1* | 6/2013 | Hein .................... B60L 53/20 320/109 |
| 2013/0146759 | A1* | 6/2013 | Ouyang ............ H01J 49/0027 250/282 |
| 2015/0192508 | A1 | 7/2015 | Janka |

FOREIGN PATENT DOCUMENTS

| | | |
|---|---|---|
| CN | 102066900 A | 5/2011 |
| CN | 102147350 A | 8/2011 |
| CN | 103926178 A | 7/2014 |
| DE | 4008348 A1 | 9/1991 |
| EP | 1924836 A2 | 5/2008 |
| GB | 1335778 A | 10/1973 |
| JP | 2005091043 A | 4/2005 |
| JP | 2006153746 A | 6/2006 |
| JP | 2006194882 A | 7/2006 |
| JP | 2011069268 A | 4/2011 |
| JP | 2011513742 A | 4/2011 |
| JP | 2011158399 A | 8/2011 |
| JP | 2011185939 A | 9/2011 |
| JP | 2015507208 A | 3/2015 |
| JP | 2015068808 A | 4/2015 |
| WO | 2006127803 A2 | 11/2006 |
| WO | 2007072942 A1 | 6/2007 |
| WO | 2009109688 A1 | 9/2009 |
| WO | 2010007965 A1 | 1/2010 |
| WO | 2012022842 A1 | 2/2012 |
| WO | 2013121094 A1 | 8/2013 |
| WO | 2013132154 A1 | 9/2013 |
| WO | 2017072396 A1 | 5/2017 |
| WO | 2017072397 A1 | 5/2017 |

OTHER PUBLICATIONS

European Patent Office, Supplementary European Search Report, Application No. EP 16859133, dated Jun. 7, 2019, 7 pages.
H. Burtscher "Physical characterization of particulate emissions from diesel engines: a review" Journal of Aerosol Science 36 (2005), Received in revised from Dec. 7, 2004, doi: 10.1016/j.jaerosci.2004.12.001, 37 pages.
Ott et al. "Using multiple continuous fine particle monitors to characterize tobacco, incense, candle, cooking, wood burning, and vehicular sources in indoor, outdoor, and in-transit settings" Atmospheric Environment, accepted Aug. 11, 2005, doi: 10.1016/j.atmosenv.2005.08.020, 23 pages.
Written Opinion of the International Searching Authority, Application No. PCT/FI2016/050684, dated Jan. 5, 2017, 8 pages.
International Search Report, Application No. PCT/FI2016/050684, dated Jan. 2, 2017, 5 pages.
Notification of Reasons for Refusal issued in JP Patent Application No. 2018-540222 dated Nov. 7, 2019, 12 pages, 9 pages of English Translation attached.
Notification of Reasons for Refusal issued in JP Patent Application No. 2018-540223 dated Nov. 7, 2019, 11 pages, 8 pages of English Translation attached.
Japanese Patent Office, Office Action. Application No. 2018-540221, dated Jan. 7, 2020. 3 Pages. (English Translation Attached).
National Intellectual Property Administration, P.R. China, First Office Action, Application No. 2016800763202, dated Mar. 12, 2019; Application dated Oct. 3, 2016 (14 Pages).
National Intellectual Property Administration, P.R. China, First Office Action, Application No. 201680076336.3, dated Mar. 8, 2019, Application dated Oct. 3, 2016 (16 Pages).

* cited by examiner

Cross section A-A

CHARGING UNIT FOR A PARTICLE MONITORING APPARATUS, AND A PARTICLE MONITORING APPARATUS

FIELD

The aspects of the disclosed embodiments relate to measuring aerosol particles.

BACKGROUND

Aerosol particles may be suspended e.g. in the exhaust gas of an internal combustion engine. Aerosol measurements may be used e.g. for checking whether the concentration of aerosol particles is lower than a predetermined limit.

Aerosol particles may be charged by using a corona discharge. The particles may be measured by collecting the particles and by detecting the electric charges of the collected particles.

SUMMARY

Some versions may relate a method for measuring aerosol particles. Some versions may relate to a method for charging aerosol particles. Some versions may relate to a particle monitoring apparatus, which comprises a charging unit. Some versions may relate to a charging unit.

According to an aspect, there is provided a particle monitoring apparatus (200,500), which comprises:
  a charging unit (CUNIT1) to form charged particles (P2) from aerosol particles (P1) carried by an input flow (FG2), and
  a detector (DET1) to provide an electric current ($I_p(t)$) by collecting the charged particles (P2),
wherein the charging unit (CUNIT1) in turn comprises:
  a counter-electrode (ELE0) having a substantially hemispherical inner portion to define a charging space (SPC1),
  an inlet channel (CH1) for guiding aerosol particles (P1) into the charging space (SPC1),
  a corona electrode (TIP1) to form charged particles (P2) from the aerosol particles (P1) by generating a corona discharge in the charging space (SPC1), and
  an outlet channel (CH2) for guiding the charged particles (P2) from the charging space (SPC1).

According to an aspect, there is provided a charging unit (CUNIT1) for a particle monitoring apparatus (200,500), the charging unit (CUNIT1) comprising:
  a counter-electrode (ELE0) having a substantially hemispherical inner portion to define a charging space (SPC1),
  an inlet channel (CH1) for guiding aerosol particles (P1) into the charging space (SPC1),
  a corona electrode (TIP1) to form charged particles (P2) from the aerosol particles (P1) by generating a corona discharge in the charging space (SPC1), and
  an outlet channel (CH2) for guiding the charged particles (P2) from the charging space (SPC1).

According to an aspect, there is provided a method for measuring aerosol particles by using the particle monitoring apparatus.

According to an aspect, there is provided a method for charging aerosol particles by using the charging unit.

Further aspects are defined in the claims.

The electric current $I_p(t)$ obtained from the detector may be indicative of the instantaneous concentration of aerosol particles of the input flow. In particular, the electric current may be indicative of the instantaneous active surface area concentration of aerosol particles of the input flow. Thus, the electric current obtained from the detector may allow continuous monitoring of the concentration.

The apparatus may be used for detecting rapid changes of the aerosol concentration. The response time of the monitoring signal may be e.g. shorter than 1 s, or even shorter than 0.1 s.

The monitoring signal may be recorded in a memory such that the recorded monitoring signal is associated with time information. The recorded monitoring signal may be associated with one or more time stamps.

The particle monitoring apparatus comprises the charging unit. The counter-electrode of the charging unit may define a substantially hemispherical charging space. The hemispherical charging space may provide effective charging of particles. The hemispherical charging space is not easily clogged by the particles carried by the air flow. The shape of the corona electrode may be changed during operation due to electrode erosion. The substantially hemispherical charging space may provide a symmetric electric field, which in turn may facilitate maintaining the symmetrical shape of the corona electrode during operation. The substantially hemispherical charging space may reduce or minimize electrical power needed for generating the corona discharge. The hemispherical charging space may reduce the effect of a change of gas flow rate on the degree of charging of the particles.

A primary electric current generated by collecting the charged particles may be very weak. The apparatus may comprise e.g. an electrometer for measuring the magnitude of the primary electric current, and the apparatus may provide a secondary current signal, which is indicative of the magnitude of the primary electric current. The secondary current signal may be e.g. a digital signal. The secondary current signal may be called e.g. as the monitoring signal. The monitoring signal may be substantially proportional to the primary electric current signal.

The particle monitoring apparatus may be operated alone or in combination with one or more additional measuring instruments, e.g. with a particle collecting unit and/or a with a gas analyzer. Information obtained from the monitoring device may be used e.g. for triggering and/or controlling operation of the additional measuring instrument. Information obtained from the monitoring apparatus may be used e.g. checking the validity of a measurement result obtained from the additional measuring instrument.

For example, the additional measuring instrument may be a particle collecting unit, which comprises a particle filter. The additional measuring instrument may be arranged to capture aerosol particles to the particle filter during a particle collecting period. The total mass of particles collected by the filter may be determined by a gravimetric method, and the average mass concentration of the particles may be determined by dividing the total mass with the total volume of gas guided through the filter during the particle collecting period. The total mass of particles collected by the filter may be determined by weighing the filter after the collecting time period. Collecting a sufficient amount of particles may require a minimum time period, so as to attain a sufficient weighing accuracy. The minimum time period may depend on the concentration of the particles. A lower concentration may require a longer time period. At a higher concentration, the collecting time period may be shorter, respectively. Controlling the length of the collecting time period based on the monitoring signal may save time and costs. In an embodiment, the operation of the particle filter may be controlled based on the continuous monitoring. The monitoring signal may be used to trigger a particle collection period. For example, collecting particles by the filter may be started when the value of the monitoring signal or the rate of change of the monitoring signal exceeds a predetermined threshold value.

Analysis of the monitoring signal may allow estimating the validity and/or diagnostic value of a gravimetric measurement result. For example, a gravimetric measurement result obtained by weighing the filter may deviate from the true value e.g. due to erroneous handling of the filter. The monitoring signal may be used e.g. for checking the reliability of the gravimetric measurement result. Gravimetric measurement results obtained after several measurement periods may be compared with the monitoring signal in order to determine whether variations of the gravimetric measurement results are correlated with variations of the monitoring signal.

An experiment involving aerosol measurements may be interrupted if analysis of the monitoring signal indicates an abnormal behavior. For example, the experiment may be interrupted if the monitoring signal indicates a change of signal in a situation where a substantially constant value is expected. For example, the experiment may be interrupted if the monitoring signal indicates a constant signal in a situation where a change of the signal is expected. Time spent on failed experiments may be reduced. Evaluating the progress of an experiment based on the monitoring signal may save time and costs.

BRIEF DESCRIPTION OF THE DRAWINGS

In the following examples, several versions will be described in more detail with reference to the appended drawings, in which.

DETAILED DESCRIPTION

Figure 1:
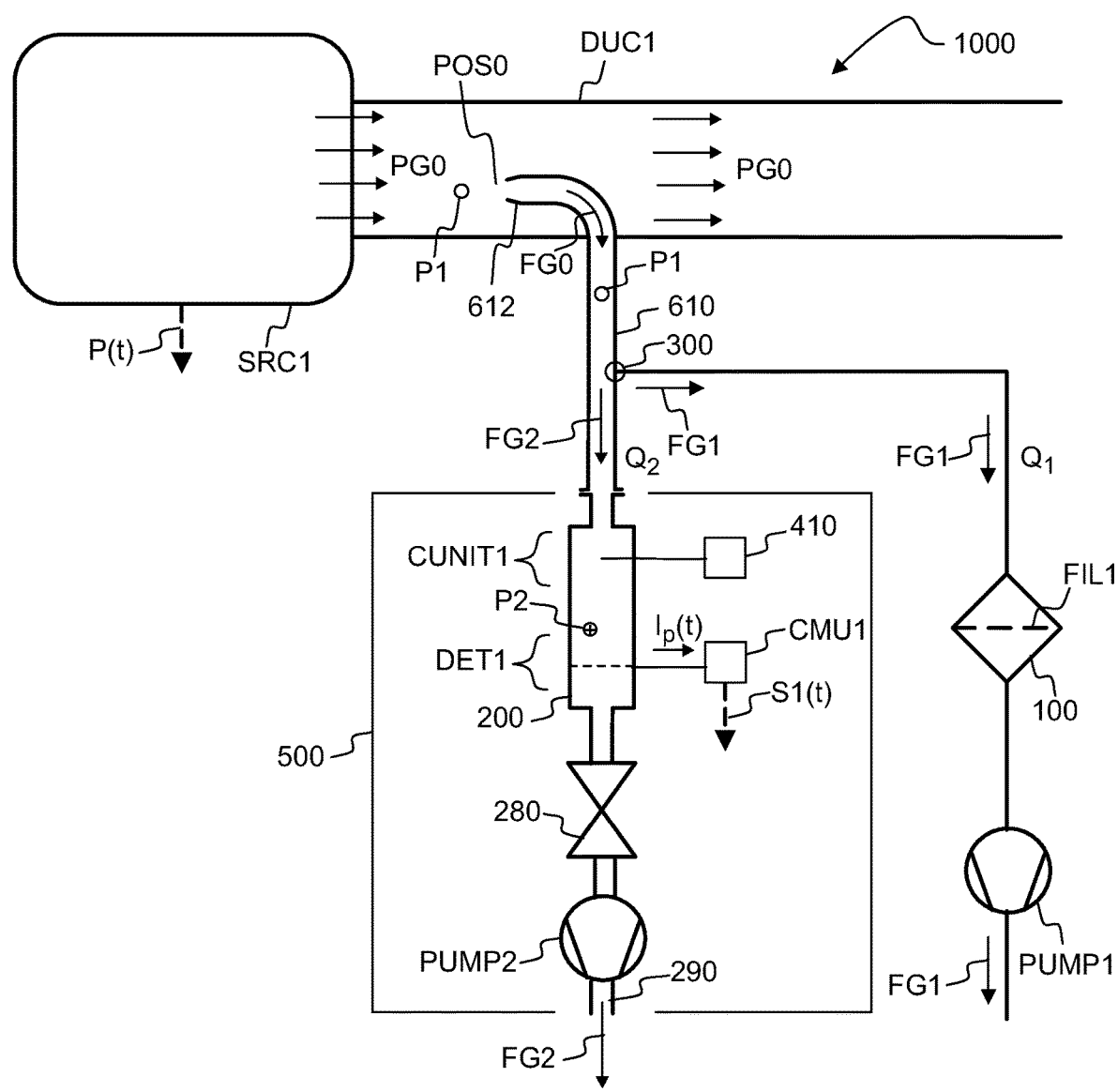
FIG. 1 shows, by way of example, in a cross-sectional view, a particle measuring apparatus connected to operate as a part of an aerosol measurement system.
Figure 2:
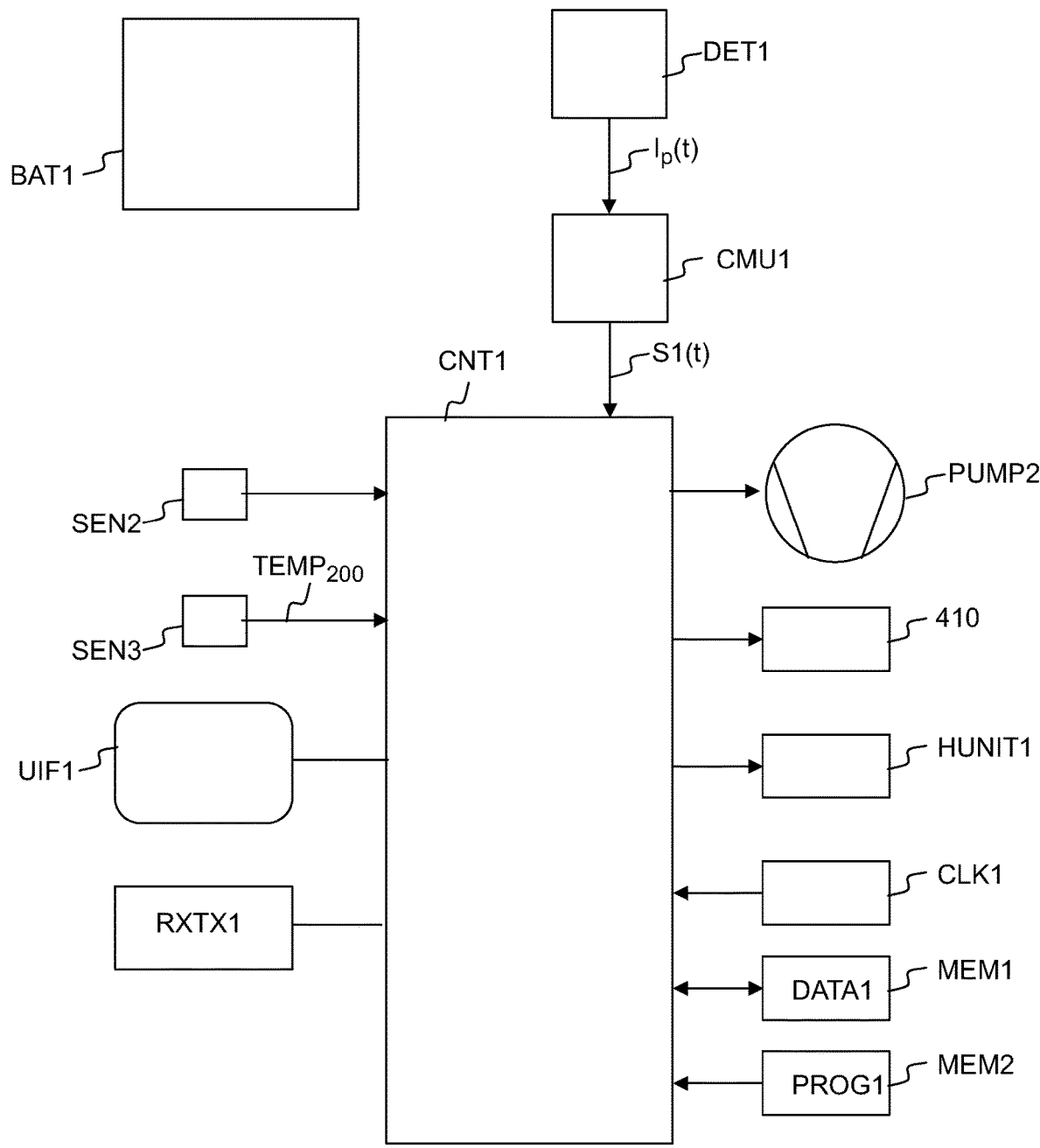
FIG. 2 shows, by way of example, a control system of the particle measuring apparatus.

Referring to FIG. 1, an aerosol measurement system 1000 may be arranged to measure aerosol particles P1 of a primary gas PG0. The primary gas PG0 may carry aerosol particles P1, which may be generated by an aerosol particle source SRC1. The source SRC1 may be e.g. a combustion facility or a chemical plant. The source SRC1 may be e.g. a heating boiler, an oil burner, a gas burner, a pulverized coal burner, an incineration furnace, a fluidized bed boiler, an internal combustion engine, a gas turbine, or an oil refinery. The primary gas PG0 may carry aerosol particles P1. The particles P1 may be e.g. solid or liquid particles. The size of the aerosol particles P1 may be e.g. in the range of 5 nm to 50 µm. The input gas flow FG0 containing the particles P1 may also be called as the input aerosol flow FG0.

The primary gas PG0 may be guided or contained in a gas duct DUC1. The gas duct DUC1 may be e.g. a flue gas duct of a combustion facility. The gas duct DUC1 may be e.g. an exhaust gas duct. The primary gas PG0 may also be ambient gas, in particular ambient air. The ambient gas may be guided by the gas duct DUC1. Alternatively, the duct may be omitted, i.e. ambient gas may be sampled directly without using the duct DUC1. The system 1000 may comprise a sampling nozzle 612 for separating an aerosol sample flow FG0 from the primary gas PG0. The orifice of the sampling nozzle 612 may be located at a sampling point POS0. The aerosol measurement system 1000 may comprise a sampling line 610 to guide an aerosol sample flow FG0 from the gas duct DUC1 to the measuring apparatus 500. The aerosol sample flow FG0 may also be called e.g. as an input flow FG0.

The aerosol measurement system 1000 may comprise an aerosol measuring apparatus 500, which may be arranged to continuously monitor the particles P1 of the primary gas PG0. The sample gas flow FG0 may be separated from the primary gas PG0 e.g. by using a sampling nozzle 612. The sample flow FG0 may be guided to the aerosol measuring apparatus 500 via a sampling line 610. The flow FG2 denotes an input flow guided to the monitoring device 200. The concentration of aerosol particles P1 carried by the flow FG2 may be proportional to the concentration of aerosol particles P2 in the primary gas PG0. The flow FG2 may be e.g. separated from the sample flow FG0 and/or the input flow FG2 may be formed from the sample flow FG0 by diluting the sample flow FG0. The sample flow FG0 may also be directly guided to the monitoring device 200 as the input flow FG2.

The particle monitoring device 200 may comprise a charging unit CUNIT1 to form charged particles P2 by charging the aerosol particles P1. The apparatus 500 may comprise a voltage supply 410 to provide operating power for the charging unit CUNIT1. The monitoring device 200 may comprise a detector DET1 to detect the charge carried by the charged particles P2. The detector DET1 may provide an electric current $I_p(t)$, which may be substantially proportional to the charge of the charged particles captured by the detector DET1 per unit time. The apparatus 500 may comprise a current monitoring unit CMU1 to measure the electric current $I_p(t)$. The current monitoring unit CMU1 may comprise e.g. an electrometer for measuring the magnitude of the electric current $I_p(t)$ conducted from the detector DET1 to the current monitoring unit CMU1. The magnitude of the electric current $I_p(t)$ may be indicative of the instantaneous active surface area concentration of aerosol particles captured by the detector DET1. The electric current $I_p(t)$ may be interpreted to carry a signal, which comprises information about the concentration. The electric current $I_p(t)$ may also be called as the electric current signal $I_p(t)$. The electric current signal $I_p(t)$ may be sent from the detector DET1 to the current monitoring unit CMU1.

The current monitoring unit CMU1 may substantially continuously provide a monitoring signal S1(*t*) based on the electric current $I_p$(t) obtained from the detector DET1. The current monitoring unit CMU1 may provide e.g. a digital monitoring signal S1(*t*) based on the measured electric current $I_p$(t). The monitoring device 200 may provide a monitoring signal S1(*t*) which is indicative of the instantaneous concentration of aerosol particles carried by the flow FG2.

The monitoring signal S1(*t*) may also be indicative of the instantaneous concentration of aerosol particles carried by the sample flow FG0. The monitoring signal S1(*t*) may also be indicative of the instantaneous concentration of aerosol particles in the primary gas PG0. The concentration of aerosol particles carried by the flow FG2 may be proportional to the concentration of aerosol particles carried by the flow FG0. The dimensions of the sampling nozzle 612 and the gas flow rates of the flows FG0, FG2 may be selected such that the concentration of aerosol particles P1 carried by the flow FG2 is substantially equal to the concentration of aerosol particles in the primary gas PG0. The dimensions of the sampling nozzle 612 and the gas flow rates of the flows FG0, FG2 may be selected such that the size distribution of aerosol particles P1 carried by the flow FG2 is substantially equal to the concentration of aerosol particles in the primary gas PG0.

The apparatus 500 may be considered to be a first measuring instrument. The aerosol measurement system 1000 may optionally comprise one or more additional measuring instruments 100, e.g. a gas analyzer unit and/or a filter unit. The filter unit 100 may comprise a filter FIL1. The filter unit 100 may be arranged to capture particles P1 of the primary gas PG0 e.g. for gravimetric measurement of the mass concentration of the particles P1. The chemical composition of the captured particles may be determined by chemical analysis. For example, the structure of the captured particles may be determined by using a scanning electron microscope (SEM) or by using a transmission electron microscope (TEM). The analyzer unit 100 may be arranged to analyze e.g. the chemical composition of the primary gas PG0. The analyzer unit 100 may be arranged to analyze e.g. the concentration of a gaseous component of the primary gas PG0. The aerosol measurement system 1000 may optionally comprise a pump PUMP1 for drawing a gas flow FG1 through the additional measuring instrument 100.

The system 1000 may optionally comprise a distributor 300 to separate the gas flow FG1 and/or the gas flow FG2 from the sample flow FG0. The gas flow FG2 may be guided to the monitoring device 200. The flow FG1 may be guided to an additional measuring instrument 100. The flow FG0 may have a flow rate $Q_0$. The flow FG1 may have a flow rate $Q_1$. The flow FG2 may have a flow rate $Q_2$. The flow rate $Q_0$ may be equal to the sum $Q_1+Q_2$. The detector DET1 of the monitoring device 200 may provide an electric current $I_p$(t), which is indicative of the concentration of the aerosol particles P1 carried by the gas flow FG2. The detector DET1 of the monitoring device 200 may provide an electric current $I_p$(t), which is indicative of the concentration of the aerosol particles P1 carried by the input gas flow FG0.

The aerosol measuring apparatus 500 may optionally comprise a pump PUMP2 for drawing the gas flow FG2 through the particle monitoring device 200. The aerosol measuring apparatus 500 may optionally comprise a valve 280 for controlling the gas flow FG2. The pump PUMP2 may be positioned downstream of the detector DET1 so that the pump PUMP2 does not remove particles from the gas flow FG2 before the particles P2 are detected by the detector DET1. The pump PUMP2 may be e.g. a diaphragm pump, a piston pump, a rotary vane pump, or a peristaltic pump. The gas flow FG2 guided through the monitor device 200 may be vented e.g. into the atmosphere or into a ventilation duct. After the flow FG2 has been drawn through the pump PUMP2, the flow FG2 may be discharged from an outlet 290 e.g. Into the ambient air outside the apparatus 500, or into a ventilation duct.

The apparatus 500 may optionally comprise the valve 280 for controlling the flow rate $Q_2$ of the gas flow FG2. The valve 280 may be e.g. a controllable magnetic valve. The valve 280 may be positioned downstream of the detector DET1.

The device 200 may be optionally kept e.g. In a heated oven e.g. in order to stabilize condensation.

The aerosol measuring apparatus 1000 may optionally comprise a dilution system for diluting the sample flow FG0. The dilution ratio may be determined and/or adjusted based on analysis of the signal S1(*t*) obtained from the monitoring unit 200. The dilution ratio may be controlled based on the current signal $I_p$(t). The dilution ratio may be increased if analysis of the current signal $I_p$(t) Indicates that the concentration is too low. The dilution ratio may be decreased if analysis of the current signal $I_p$(t) Indicates that the concentration is too high. The dilution ratio may be adjusted during a particle collecting period based on the current signal $I_p$(t). The dilution ratio may be set to a determined value before the start of a particle collecting period, based on the current signal $I_p$(t).

The aerosol particle source SRC1 may optionally provide a process indicator signal P(t). The monitor signal S1(*t*) may be compared with the process indicator signal P(t) in order to determine whether a change of an operating parameter of the particle source SRC1 corresponds to a change of the monitor signal S1(*t*). The monitor signal S1(*t*) may be compared with the process indicator signal P(t) in order to determine whether the monitor signal S1(*t*) correlates with the process indicator signal P(t). The process indicator signal P(t) may be e.g. indicative of fuel flow rate, input air flow to a combustion facility, an operating temperature of the source SRC1, operating temperature of a catalytic converter, operating temperature of a filter, operating temperature of a process, fuel feeding pressure, or a flow rate of an additive. The aerosol particle source SRC1 may simultaneously provide a plurality of process indicator signals, which may be indicative of different operating parameters of the source SRC1.

FIG. 2 shows, by way of example, a control system of the particle measuring apparatus 500. The apparatus 500 may comprise a control unit CNT1 for processing measured data and/or for controlling operation of the apparatus 500. The apparatus 500 may comprise the pump PUMP2 to draw the flow FG2 through the monitor device 200. The apparatus 500 may optionally comprise a valve 280 to control the flow FG2.

The apparatus 500 may comprise the detector DET1 for providing the electric current signal $I_p$(t). The apparatus 500 may comprise the current monitoring unit CMU1 to provide the monitor signal S1(*t*) from the current signal $I_p$(t). The apparatus 500 may comprise a memory MEM1 for storing measured data DATA1. The data DATA1 may comprise e.g. the measured signal $I_p$(t) and/or S1(*t*).

The apparatus 500 may comprise a memory MEM2 for storing computer program PROG1. The computer program PROG1 may comprise computer program code configured to, when executed on at least one data processor, cause the control unit CNT1 to control operation of the apparatus 500.

The computer program PROG1 may comprise computer program code configured to, when executed on at least one data processor, cause processing of measured data $I_p(t)$, $S1(t)$.

The apparatus 500 may optionally comprise a communication unit RXTX1 for receiving and/or transmitting data. The communication unit RXTX1 may transmit e.g. the monitoring signal $S1(t)$ e.g. to an external portable computer. The communication unit RXTX1 may transmit e.g. the monitoring signal $S1(t)$ e.g. to a control unit of the system 1000. The communication unit RXTX1 may transmit e.g. the monitoring signal $S1(t)$ e.g. to an Internet server. The communication unit RXTX1 may receive and/or transmit data e.g. by using wireless transmission, by using an optical cable and/or by using an electric cable. A command for starting and/or a command for stopping a measurement may be communicated via the communication unit RXTX1 to the control unit CNT1. The computer program PROG1 may be updated by receiving data via the communication unit RXTX1. The computer program PROG1 may be updated by receiving data e.g. from an Internet server.

The apparatus 500 may optionally comprise a clock CLK1 to provide time information. The monitoring signal $S1(t)$ may be recorded in the memory MEM1 as data DATA1 such that the recorded monitoring signal $S1(t)$ is associated with the time information. The monitoring signal $S1(t)$ may be recorded in the memory MEM1 as a function $S1(t)$ of time t. The data DATA1 may be time-stamped.

The apparatus 500 may optionally comprise a user interface UIF1 for providing information to a user and/or for receiving user input from a user. The user interface UIF1 may comprise e.g. a display and one or more keys. The user interface UIF1 may comprise e.g. a touch screen. The user interface UIF1 may be arranged to display e.g. the magnitude of the electric current $I_p(t)$. The interface UIF1 may be arranged to provide visual indication of the magnitude of the electric current ($I_p(t)$). The interface UIF1 may be arranged to display e.g. a curve, which indicates the magnitude of the electric current ($I_p(t)$).

The monitoring device 200 may be positioned e.g. In a heated cabinet and/or close to a hot combustion facility. The interface UIF1 may also be remote from the device 200 e.g. so that the interface UIF1 may be located at an ergonomic and/or safe position. A portable computer or a mobile device (e.g. a smartphone) may be arranged to communicate with the apparatus 500 via the communication unit RXTX1, and said portable computer or mobile device may be arranged to operate as the interface UIF1.

Data measured by the device 200 may also be processed in a distributed manner. For example, temperature compensation, compensation of a background and/or data correlation analysis may be performed in a separate data processor. The data may be processed e.g. by a portable computer and/or by using an Internet server.

The apparatus 500 may optionally comprise a rechargeable battery BAT1 e.g. for providing operating power e.g. for one or more of the following parts: the control unit CNT1, the high voltage supply 410, the charge monitoring unit CMU1, and/or the pump PUMP2. Thanks to using the battery, the apparatus 500 does not need to be connected to an electric power line during operation of the apparatus 500. After the particle collecting period, the apparatus 500 may be disconnected from the sample line 610, and moved to a location, which is remote from the sample line 610. The battery may be re-charged at a location, which is remote from the sampling line 610.

The apparatus 500 may comprise a high voltage supply 410 for providing operating voltage $U_C$ to the corona electrode ELEC3. The apparatus 500 may be arranged to control operation of the high voltage supply 410.

The apparatus 500 may optionally comprise one or more heating elements HUNIT1. The heating element HUNIT1 may be arranged to stabilize the operating temperature of the current monitoring unit CMU1. The heating element HUNIT1 may be arranged to keep the operating temperature of the current monitoring unit CMU1 substantially constant.

The apparatus 500 may comprise a flow sensor SEN2 to monitor the flow rate of the flow FG2 and/or to monitor the pressure difference of the detector DET1. The flow resistance of the detector DET1 may increase during operation due to particles captured to the filter DFIL. The flow rate $Q_2$ of the flow FG2 may depend on the flow resistance of the detector DET1. The apparatus 500 may comprise a sensor SEN2 for monitoring the pressure difference caused by the detector DET1. The sensor SEN2 may be e.g. a pressure sensor, which measures the pressure downstream the detector DET1. The sensor SEN2 may be e.g. a pressure difference sensor, which measures the pressure difference over the detector DET1. The sensor SEN2 may be e.g. a flow sensor, which may be arranged to monitor the flow rate $O_2$ of the flow FG2. The operation of the sensor SEN2 may be based on e.g. monitoring pressure difference or a change of temperature caused by the flow FG2.

The apparatus 500 may be arranged to detect when the flow resistance of the detector DET1 exceeds a predetermined limit. The detector DET1 may be replaced or cleaned if the flow resistance of the detector DET1 exceeds the predetermined limit. The apparatus 500 may be arranged to provide an indication to a user when the flow resistance of the detector DET1 exceeds a predetermined limit. The indication may be provided e.g. by using the user interface UIF1.

The apparatus 500 may be arranged to control the pump PUMP2 based on a signal obtained from the sensor SEN2 so as to keep the flow rate $Q_2$ in a predetermined range. For example, the apparatus 500 may be arranged to adjust a rotation speed of a motor of the pump PUMP2 based on a signal obtained from the sensor SEN2.

An abnormal situation of a process or combustion facility may be associated with a sudden increase of aerosol concentration. The operation of the aerosol measurement system 1000 may be controlled based on the monitoring signal provided $S1(t)$ by the monitor unit 200. For example, the aerosol measurement system 1000 may be arranged to start a gas flow FG1 though a particle collecting filter unit 100 when the monitoring signal $S1(t)$ exceeds a predetermined level, or when the rate of change of the monitoring signal $S1(t)$ exceeds a predetermined level. Consequently, a particle sample may be collected by the filter unit 100, and the monitoring signal $S1(t)$ may be recorded for subsequent analysis of the abnormal situation. The apparatus 500 may be configured to send a control signal for starting and/or stopping the gas flow FG1. The control signal may be sent e.g. via the communication unit RXTX1.

The charging unit CUNIT1 may be arranged to operate such that the corona discharge is switched on only when the flow rate $Q_2$ through the charging space SPC1 is greater than a predetermined limit. The charging unit CUNIT1 may be arranged to operate such that the corona discharge is switched off when the gas flow rate $Q_2$ of the gas flow FG2 decreases below the predetermined limit. The voltage supply 410 may be controlled based on the flow rate $Q_2$ of the flow FG2.

The monitoring signal S1(t) may drift e.g. due to a change of operating temperature of the current monitoring unit CMU1, due to erosion of a corona electrode ELEC3 and/or due to contamination of the flow channels. The apparatus 500 may be arranged to at least partly compensate the effect of temperature, erosion and/or contamination on the monitoring signal S1(t).

The operating temperature of the monitoring device 200 may have an effect on the monitoring signal. In particular, a change of the operating temperature of the current monitoring unit CMU1 may cause a change of the monitoring signal even when the particle flow to the monitoring device 200 remains unchanged. The apparatus 500 may be arranged to stabilize the operating temperature of the current monitoring unit CMU1. The apparatus 500 may be arranged to monitor the operating temperature of the monitoring device 200. The apparatus 500 may optionally comprise a temperature sensor SEN3 for monitoring the operating temperature $TEMP_{200}$ of the current monitoring unit CMU1. The apparatus 500 may comprise a heating element HUNIT1 arranged to heat the current monitoring unit CMU1. The apparatus 500 may be arranged to control the heating element HUNIT1 e.g. based on temperature information $TEMP_{200}$ obtained from the temperature sensor SEN3.

The voltage supply 410 may feed electric power to the corona electrode ELEC3. The voltage supply 410 and the corona discharge DSR1 may convert electric power into heat. The current monitoring unit CMU1 may be located close to the voltage supply 410 and/or close to the corona electrode ELEC3. The operation of the voltage supply 410 and the corona discharge DSR1 may have an effect on the operating temperature of the current monitoring unit CMU1. The corona discharge DSR1 may have a first operating state where the corona discharge DSR1 is operating, and a second operating state where the corona discharge DSR1 is not operating. The voltage supply 410 may have a first active operating state where the corona discharge DSR1 is operating, and a second inactive operating state where the corona discharge DSR1 is not operating. The apparatus 500 may comprise a heating element HUNIT1 arranged to heat the current monitoring unit CMU1. The apparatus 500 may be arranged to control the heating element HUNIT1 based on the operating state of the corona discharge. The apparatus 500 may be arranged to control the heating element HUNIT1 based on the operating state of the voltage supply 410. The apparatus 500 may be arranged to control the heating element HUNIT1 so as to keep the electric power consumption of the monitoring device 200 substantially constant when the operating state of the voltage supply 410 is changed. The voltage supply 410 may have a first heating power, the corona discharge DSR1 may have a second heating power, and the heating element HUNIT1 may have a third heating power. The apparatus 500 may be arranged to control the heating element HUNIT1 so as to keep the sum of said heating powers substantially constant when the operating state of the voltage supply 410 is changed.

The apparatus 500 may be arranged to compensate an effect of the operating temperature on the monitoring signal based on temperature information obtained from the temperature sensor SEN3. The apparatus 500 may be arranged to provide a temperature-compensated monitoring signal S1(t). The apparatus 500 may comprise a memory, which comprises predetermined temperature compensation data. The apparatus 500 may be arranged to provide a temperature-compensated monitoring signal S1(t) from the current $I_p(t)$ by using information about the measured operating temperature and by using the temperature compensation data.

In an embodiment, a plurality of identical monitoring devices 200 may be manufactured. The temperature compensation data may be determined separately for each individual monitoring device 200. Each individual monitoring device 200 may be associated with temperature compensation data associated with said monitoring device 200. Temperature compensation data associated with a first monitoring device 200 may be different from temperature compensation data associated with a second monitoring device 200. When a first monitoring device 200 is replaced with a second monitoring device 200, the temperature compensation data associated with the second monitoring device 200 may be stored in the memory of the apparatus 500. The temperature compensation data may be e.g. retrieved from an Internet server based on an identification code of the second monitoring device 200. The second monitoring device 200 may also comprise a memory for storing the pre-determined temperature compensation data associated with the second monitoring device 200. The temperature compensation data also may be inputted to a memory of the apparatus 500 manually by using a user interface UIF1.

The monitoring signal S1(t) provided by the device 200 may be compensated e.g. by using a background signal value $S_{REF}$. The background signal value $S_{REF}$ may be determined experimentally e.g. by measuring the electric current signal $I_p(t)$ of the detector DET1 in a situation where the flow FG2 through the detector DET1 is zero. The flow FG2 may be reduced to zero e.g. by closing the valve 280. The flow rate $Q_2$ of the flow FG2 is greater than zero during normal operation. A compensated monitoring signal S1(t) may be determined from the electric current signal $I_p(t)$ measured during the normal operation by using the background signal value $S_{REF}$. The apparatus 500 may be arranged to determine a compensated monitoring signal S1(t) from the electric current signal $I_p(t)$ measured during the normal operation by using the background signal value $S_{REF}$.

The apparatus 500 may be arranged to measure a first background signal value $S_{REF1}$ by measuring the electric current $I_p(t_{R1})$ at a first time $t_{REF1}$ when that the flow FG2 is substantially equal to zero. The apparatus 500 may be arranged to measure a second reference value $S_{REF2}$ at a second time $t_{REF2}$ when that the flow FG2 is substantially equal to zero. The time $t_{REF1}$ may be e.g. before the start of a particle colleting period $T_{tot}$, and the time $t_{REF2}$ may be after the end of a particle collecting period $T_{tot}$. The background signal value $S_{REF2}$ may also be different from the background signal value $S_{REF1}$.

A compensated monitoring signal S1(t) may be determined from the electric current signal $I_p(t)$ measured during the normal operation by using the background signal values $S_{REF1}$ and $S_{REF2}$.

$\Delta S_{REF}$ denotes the change between the signals $S_{REF1}$, $S_{REF2}$ (i.e. $\Delta S_{REF} = S_{REF2} - S_{REF1}$). The validity of the electric current signal $I_p(t)$ measured during normal operation may be evaluated based on the change $\Delta S_{REF}$. The electric current signal $I_p(t)$ may be determined to be valid if the change $\Delta S_{REF}$ is smaller than a predetermined limit. The electric current signal $I_p(t)$ may be determined to be invalid if the change $\Delta S_{REF}$ exceeds the predetermined limit.

The apparatus 500 may be configured to determine the compensated monitoring signal S1(t) from the measured electric current signal $I_p(t)$ by using one or more background signal values $S_{REF1}$, $S_{REF2}$ and/or by using temperature information.

An external data processing device may be configured to determine the compensated monitoring signal $S1(t)$. In particular, a portable computer may be configured to determine the compensated monitoring signal $S1(t)$ from the measured electric current signal $I_p(t)$ by using one or more background signal values $S_{REF1}$, $S_{REF2}$ and/or by using temperature information.

The compensated monitoring signal $S1(t)$ may be determined substantially in real time or after the end of the particle collecting time period $T_{tot}$. The current monitoring unit CMU1 may provide auxiliary signal data $S_{Aux}(t)$, which may be indicative of the instantaneous magnitude of the electric current $I_p(t)$. The compensated monitoring signal $S1(t)$ may be subsequently determined from the auxiliary signal data $S_{Aux}(t)$ by using information about the background signal values $S_{REF1}$, $S_{REF2}$. The auxiliary signal data $S_{Aux}(t)$ may be optionally recorded in a memory, and the compensated monitoring signal $S1(t)$ may be determined from the auxiliary signal data $S_{Aux}(t)$ after the end of the particle collecting time period $T_{tot}$.

Figure 3:
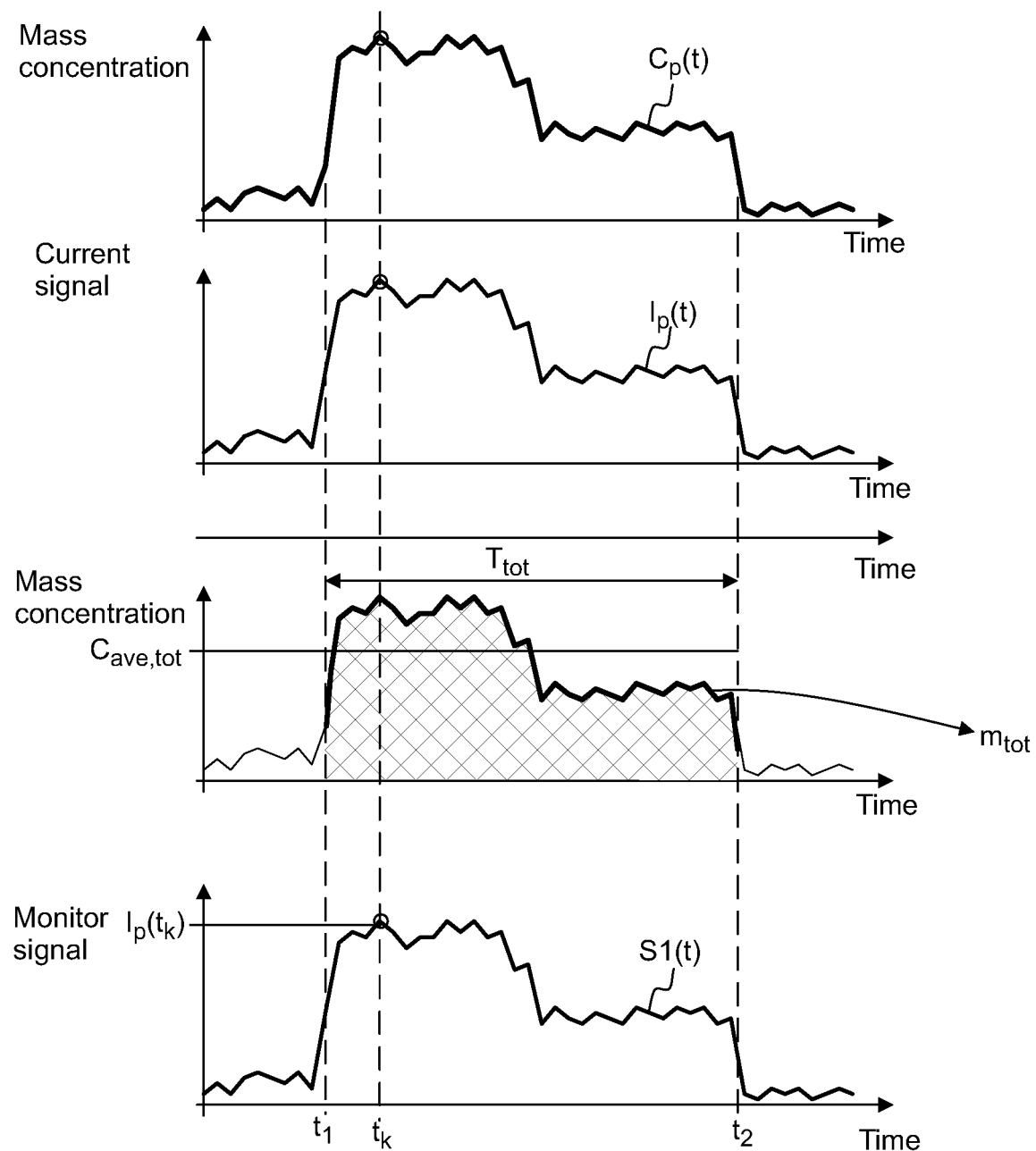
FIG. 3 shows, by way of example, formation of the current signal and the monitoring signal.

FIG. 3 illustrates, by way of example, formation of the measured signals.

The uppermost curve of FIG. 3 shows, by way of example, the temporal evolution of the concentration $C_p(t)$ of aerosol particles of the input flow FG0. $C_p(t)$ denotes the actual mass concentration. The aim of the particle measurement may be to provide one or more measured values, which represent the actual mass concentration $C_p(t)$.

The second curve from the top of FIG. 3 shows the temporal evolution of the electric current $I_p(t)$. The electric current $I_p(t)$ may be substantially proportional to the active surface area concentration of the aerosol particles of the input flow FG0. To the first approximation, the temporal variations of the active surface area concentration may provide an estimate for the temporal variations of the mass concentration $C_p(t)$.

The electric current $I_p(t)$ may also depend on the flow rate $Q_2$ of the flow FG2. The electric current $I_p(t)$ may be substantially proportional to the flow rate $Q_2$.

Referring to the third curve from the top of FIG. 3, the aerosol particles may be collected by a filter FIL1. The flow FG1 through the filter FIL1 may be started at a time t and stopped at the time $t_2$. The time period $T_{tot}$ may denote the time period between the times $t_1$ and $t_2$. The total mass $m_{tot}$ of the particles collected by a filter FIL1 during the time period $T_{tot}$ may be measured by weighing the filter FIL1 after the measurement period $T_{tot}$. The total mass $m_{tot}$ may be substantially equal to the integral of the product $Q_1(t) \cdot C_p(t)$ over the time period $T_{tot}$. The average concentration $C_{ave,tot}$ representing the whole time period $T_{tot}$ may be determined by dividing the total mass mw by the total gas volume $V_{tot}$ guided through the filter FIL1 during the time period $T_{tot}$.

The lowermost curve of FIG. 3 shows the monitoring signal $S1(t)$ determined from the electric current $I_p(t)$. The monitoring signal $S1(t)$ may be indicative of the electric current $I_p(t)$. The monitoring signal $S1(t)$ may be substantially proportional to the electric current $I_p(t)$.

An instantaneous concentration value $C_1(t)$ may be determined from the average concentration $C_{ave,tot}$ by using the measured current signal $I_p(t)$.

An estimate $C_1(t_k)$ for the instantaneous concentration $C_p(t_k)$ at a time $t_k$ may be determined from the average concentration $C_{ave,tot}$ by using the measured electric current $I_p(t)$:

$$C_1(t_k) = \frac{I_p(t_k) \cdot (t_2 - t_1)}{\int_{t_1}^{t_2} I_p(t)dt} \cdot C_{ave,tot} \quad (1)$$

The equation (1) may be used for interpolation, i.e. the time period $T_{tot}$ may comprise the time $t_k$. The equation (1) may provide a proportionality constant for calculating the estimate $C_1(t_k)$ of the instantaneous concentration $C_p(t_k)$ from the instantaneous current value $I_p(t_k)$. In an embodiment, an estimate $C_1(t_k)$ of the instantaneous concentration $C_p(t_k)$ may be calculated by using said proportionality constant also when the time period $T_{tot}$ from the time $t_1$ to the time $t_2$ does not comprise the time $t_k$. In other words, the estimate $C_1(t_k)$ may also be calculated by extrapolation.

The monitoring signal $S1(t)$ may be substantially proportional to the electric current signal $I_p(t)$. The electric current signal $I_p(t)$ appearing in equation (1), be replaced with the monitoring signal $S1(t)$.

Figure 4A:
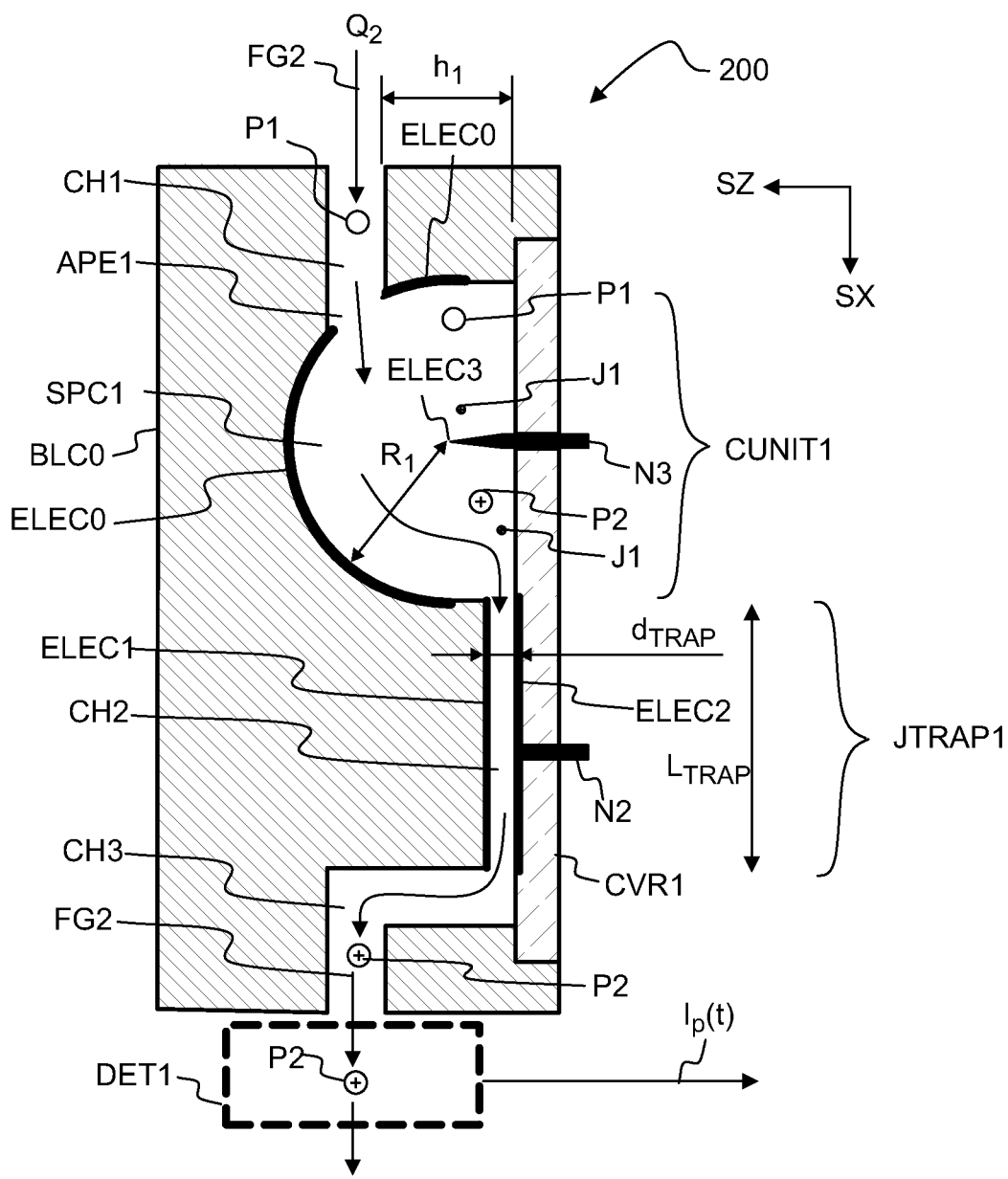
FIG. 4a shows, by way of example, in a cross-sectional view, a particle monitoring device of the particle measuring apparatus.

Referring to FIG. 4a, the monitoring device 200 may comprise a charging unit CUNIT1 and a charge detector DET1. The charging unit CUNIT1 may provide charged particles P2 by charging at least a part of the particles P1 carried by the flow FG2. The charging unit CUNIT1 may convert at least a part of the particles P1 of the flow FG2 into charged particles P2. The charging unit CUNIT1 may comprise a corona electrode ELEC3 and a counter electrode ELEC0 for generating ions J1 by a corona discharge DSR1. The ions J1 may form charged particles P2 by exchanging charge with neutral aerosol particles P1. The corona electrode ELEC3 may operate together with the counter-electrode ELEC0. The electrodes ELEC3, ELEC0 may be connected to the high voltage supply 410 such that the electrodes ELEC3, ELEC0 have a voltage difference $U_C - U_0$. The corona electrode ELEC3 and the counter-electrode ELEC0 may together form an electric field EF0, which generates the corona discharge DSR1 (FIG. 4c). The strength of the electric field EF0 may locally exceed the dielectric strength of the gas guided through the charging space between the electrodes ELEC0, ELEC3 so that the corona discharge DSR1 may be formed in the vicinity of the corona electrode ELEC3.

The corona electrode ELEC3 and the counter-electrode ELEC0 may together define a substantially hemispherical charging space SPC1. The charging space SPC1 may also be called e.g. as the charging volume or as the charging zone. The gas flow FG2 and neutral particles P1 may be guided into the charging space SPC1 via an inlet channel CH1. The gas flow FG2 and charged particles P2 may be guided from the charging space SPC1 via an outlet channel CH2.

The counter-electrode ELEC0 may be substantially hemispherical. The counter-electrode ELEC0 may have a surface portion, which is substantially hemispherical. The counter-electrode ELEC0 may have a substantially spherical surface to define a hollow half of a sphere. The corona electrode ELEC3 may be a conductive element which has an exposed sharp tip. The tip of the corona electrode ELEC3 may be located at an axis of symmetry of the hemispherical charging space SPC1. The distance between the tip and each point of the hemispherical portion of the electrode ELEC0 may be substantially equal to $R_1$. The charging of the particles may take place in the charging space SPC1 between the corona electrode ELEC3 and the counter-electrode ELEC0.

The shape of the corona electrode ELEC3 may change during operation due to electrode erosion. The substantially hemispherical charging space SPC1 may provide a symmetric electric field, which in turn may facilitate maintaining the symmetrical shape of the corona electrode ELEC3 during operation. The substantially hemispherical charging space SPC1 may reduce or minimize electrical power needed for generating the corona discharge. The hemispherical charging space may e.g. reduce the effect of a change of temperature on the degree of charging of the particles. The hemispherical charging space may e.g. reduce the effect of a change of gas flow rate on the degree of charging of the particles. The hemispherical charging space may help to provide sufficient gas velocity in the vicinity of the surfaces of the charging space, so as to minimize deposition of particles to said surfaces. The particles may travel through the charging space SPC1 along different paths. A first path may be close to the corona electrode ELEC3. A second path may be close to the counter electrode ELEC0. The density of ions J1 close to the corona electrode ELEC3 may be higher than the density of ions J1 close to the counter electrode ELEC0. The hemispherical shape may reduce the residence times of the particles in the charging space SPC1. The hemispherical shape may facilitate providing a fast response time.

Particles traveling along the first path may have a shorter residence time in the charging space SPC1 but they may be exposed to a higher ion density. Particles traveling along the second path may have a second longer residence time in the charging space SPC1 but they may be exposed to a lower ion density. Thus, the hemispherical shape may reduce the effect of the different paths on the final degree of charging of the charged particles P2.

The counter-electrode ELEC0 may be substantially impermeable to the gas in order to define the gas flow passing through the charging space SPC1. The counter-electrode ELEC0 may be substantially impermeable to the gas of the gas flow FG2 in order to ensure that substantially all particles of the gas flow FG2 pass from the channel CH1 to the channel CH2 through the charging space SPC1. The outlet channel CH2 may be e.g. substantially parallel with the inlet channel CH1.

The counter-electrode ELEC0 may have an inner radius $R_1$. The substantially hemispherical portion of the counter-electrode ELEC0 may comprise an opening APE1 for guiding the flow FG2 from the inlet channel CH1 to the charging space SPC1. The substantially hemispherical counter-electrode ELEC0 may define the opening APE1 for guiding the flow FG2 from the inlet channel CH1 to the charging space SPC1. The flow FG2 may pass from the inlet channel CH1 to the charging space SPC1 via the opening APE1 of the counter-electrode ELEC0. The dimension hi may denote the distance between the opening APE1 and the planar portion of the boundary of the hemispherical charging space SPC1. The distance hi may be e.g. greater than 0.3 times the inner radius $R_1$ in order to prevent a straight travel path of particles through the charging space SPC1.

The corona electrode ELEC3 may have a substantially sharp tip. The radius of curvature of the tip may be e.g. smaller than 0.2 mm. The distance between the tip of the corona electrode ELEC3 and the counter-electrode ELEC0 may be substantially equal to $R_1$.

The monitoring unit 200 may comprise the ion trap JTRAP1 to remove ions J1 from the flow FG2. The gas flow FG2, the charged particles P2, and the ions J1 may be guided from the charging space SPC1 into the ion trap JTRAP1. The ion trap JTRAP1 may be located between the charging space SPC1 and the detector DET1. The gas flow FG2 and the charged particles P2 may be guided from the ion trap JTRAP1 to the detector DET1. The ion trap JTRAP1 may be positioned downstream of the charging unit CUNIT1 and upstream of the detector DET1. The ion trap JTRAP1 may remove at least a part of the ions J1 from the flow FG2, which is guided to the detector DET1. Using the ion trap JTRAP1 may stabilize the electric current $I_p(t)$. The ion trap JTRAP1 may comprise a first deflecting electrode ELEC1 and a second deflecting electrode ELEC2. The deflecting electrodes ELEC1, ELEC2 may together form an electric field, which deflects at least part of the ions J1 away from the gas flow FG2. $d_{TRAP}$ may denote the distance between the electrodes ELEC1, ELEC2. $L_{TRAP}$ may denote the length of the ion trap JTRAP1. The electric field may be substantially transverse with respect to the direction of the gas flow FG2 passing through the electrodes ELEC1, ELEC2. The ion trap may comprise e.g. a pair of substantially parallel electrodes ELEC1, ELEC2.

The radial distance $R_1$ between the electrodes ELEC3, ELEC0 may be e.g. In the range of 1 mm to 50 mm, advantageously in the range of 2 mm to 20 mm, and preferably in the range of 3 mm to 10 mm. Using a small distance $R_1$ may provide more effective charging of the particles P2. The voltage difference $U_C$-$U_0$ applied between the electrodes ELEC3, ELEC0 may be reduced when using a small distance $R_1$. However, the charging space SPC1 may be clogged or short-circuited by a particle P2 if the distance $R_1$ is very small.

The distance $d_{TRAP}$ between the deflecting electrodes ELEC1, ELEC2 may be e.g. In the range of 0.1 mm to 2 mm, advantageously in the range of 0.2 mm to 1.0 mm, and preferably in the range of 0.3 mm to 0.8 mm. The distance $d_{TRAP}$ may be e.g. smaller than 20% of the radius $R_1$. The voltage difference $U_2$-$U_1$ applied between the deflecting electrodes ELEC1, ELEC2 may be reduced when using a small distance $d_{TRAP}$. However, the channel CH2 may be clogged or short-circuited by a particle P2 if the distance $d_{TRAP}$ is very small. The length $L_{TRAP}$ may be e.g. in the range of 2 mm to 50 mm.

The deflecting electrodes ELEC1, ELEC2 may be e.g. substantially planar. The deflecting electrodes ELEC1, ELEC2 may together define a flow channel CH2. The flow channel CH2 may receive the gas flow FG2, charged particles P2, and ions J1 from the charging space SPC1. The input of the flow channel CH2 may be located close to the charging space SPC1. The input of the flow channel CH2 may be located close to a planar portion of the hemispherical charging space SPC1. The distance between the electrode ELEC2 and the corona electrode ELEC3 may be e.g. smaller than 1.2 times the radius $R_1$.

The gas flow FG2 and the charged particles P2 may be guided from the ion trap JTRAP to the particle detector DET1 via a channel CH3. The particle detector DET1 may provide the electric current signal $I_p(t)$, which may be substantially equal to the charge captured by the particle detector DET1 per unit time.

The counter-electrode ELEC0 and/or the deflecting electrode ELEC1 may be at the same electric potential. The counter-electrode ELEC0 and/or the deflecting electrode ELEC1 may be at the ground potential $U_0$. The deflecting electrode ELEC1 may be galvanically connected to the counter-electrode ELEC0. The counter-electrode ELEC0 and/or the deflecting electrode ELEC1 may be implemented on the surface of a body BLC0. The counter-electrode ELEC0 and/or the deflecting electrode ELEC1 may be implemented on the surface of a conductive body BLC0. The counter-electrode ELEC0 and/or the deflecting electrode ELEC1 may be formed e.g. from a single metal block by mechanical machining. The counter-electrode ELEC0, the deflecting electrode ELEC1, the inlet channel CH1, and the outlet channel CH2 may be formed from a single metal block by mechanical machining. This may provide an extremely rugged and stable structure. The counter-electrode ELEC0 and/or the deflecting electrode ELE3 may also be formed e.g. by molding or 3D printing. The counter-electrode ELEC0 and/or the deflecting electrode ELE3 may be formed e.g. by depositing conductive material on electrically insulating material.

The corona electrode ELEC3 and/or the deflecting electrode ELEC2 may be supported by a supporting element CVR1. The supporting element CVR1 may be electrically insulating. The supporting element CVR1 may also be called e.g. as the cover of the charging space SPC1. The electrode ELEC0 and/or ELEC1 may be galvanically connected to a contact surface N1. The corona electrode ELEC3 may be galvanically connected to a contact element N3. The deflecting electrode ELEC2 may be galvanically connected to a contact element N2. The electrodes ELEC2, ELEC3 may be on a first side of the cover CVR1, and the elements N2, N3 may be on a second side of the cover CVR1. The elements N2, N3 may also extend through the cover CVR1 from the first side to the second side. The elements N3, N2 may be e.g. metallic stubs. The planar surface of the electrically insulating cover CVR1 may partly define the hemispherical form of the charging space SPC1. The cover CVR1 may have a substantially planar surface, which may partly define the charging space SPC1. The substantially planar surface of the cover CVR1 may partly define the hemispherical charging space SPC1.

The cover CVR1 may also support the deflecting electrode ELEC2. A planar surface of the cover CVR1 may support the deflecting electrode ELEC2. The deflecting electrode ELEC2 may be substantially parallel with the planar portion of the charging space SPC1. The electrode ELEC2 may be implemented e.g. by depositing conductive material on the surface of the cover CVR1, or by attaching a conductive foil on the surface of the cover CVR1.

The planar surface of the deflecting electrode ELEC2 may partly define the flow channel CH2. The cover CVR1 may form a pressure-tight seal together with the body BLC0. The cover CVR1 may electrically insulate the corona electrode ELEC3 from the conductive body BLC0. The cover CVR1 may electrically insulate the deflecting electrode ELEC2 from the conductive body BLC0.

Using the planar electrodes ELEC1, ELEC2 may provide a simple and rugged structure. In an embodiment, the ion trap JTRAP may also be implemented by using non-planar electrodes ELEC1, ELEC2, e.g. by using a pair of concentric electrodes. The electrodes ELEC1, ELEC2 may be e.g. concentric cylindrical electrodes.

SX, SY and SZ denote orthogonal directions.

Figure 4B:
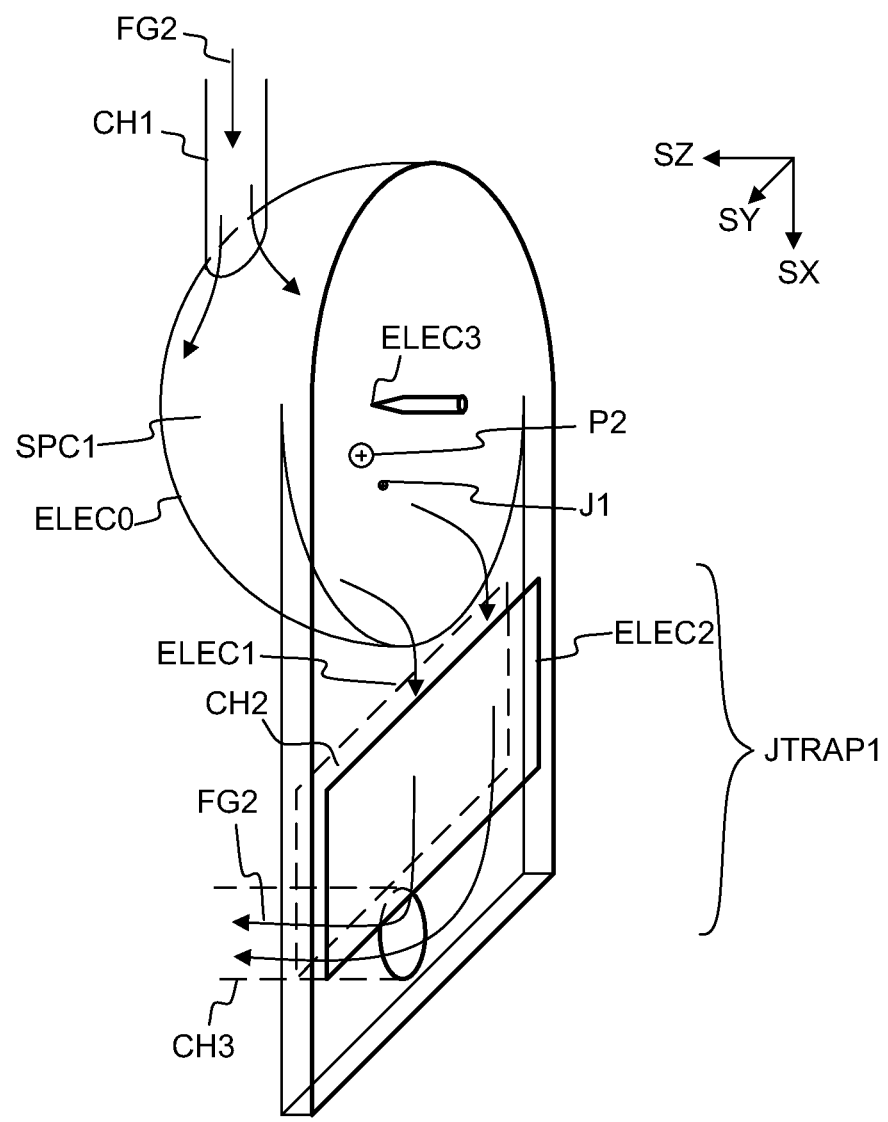
FIG. 4b shows, by way of example, in a three-dimensional view, the charging space and an ion trap of the particle monitoring device.
Figure 4C:
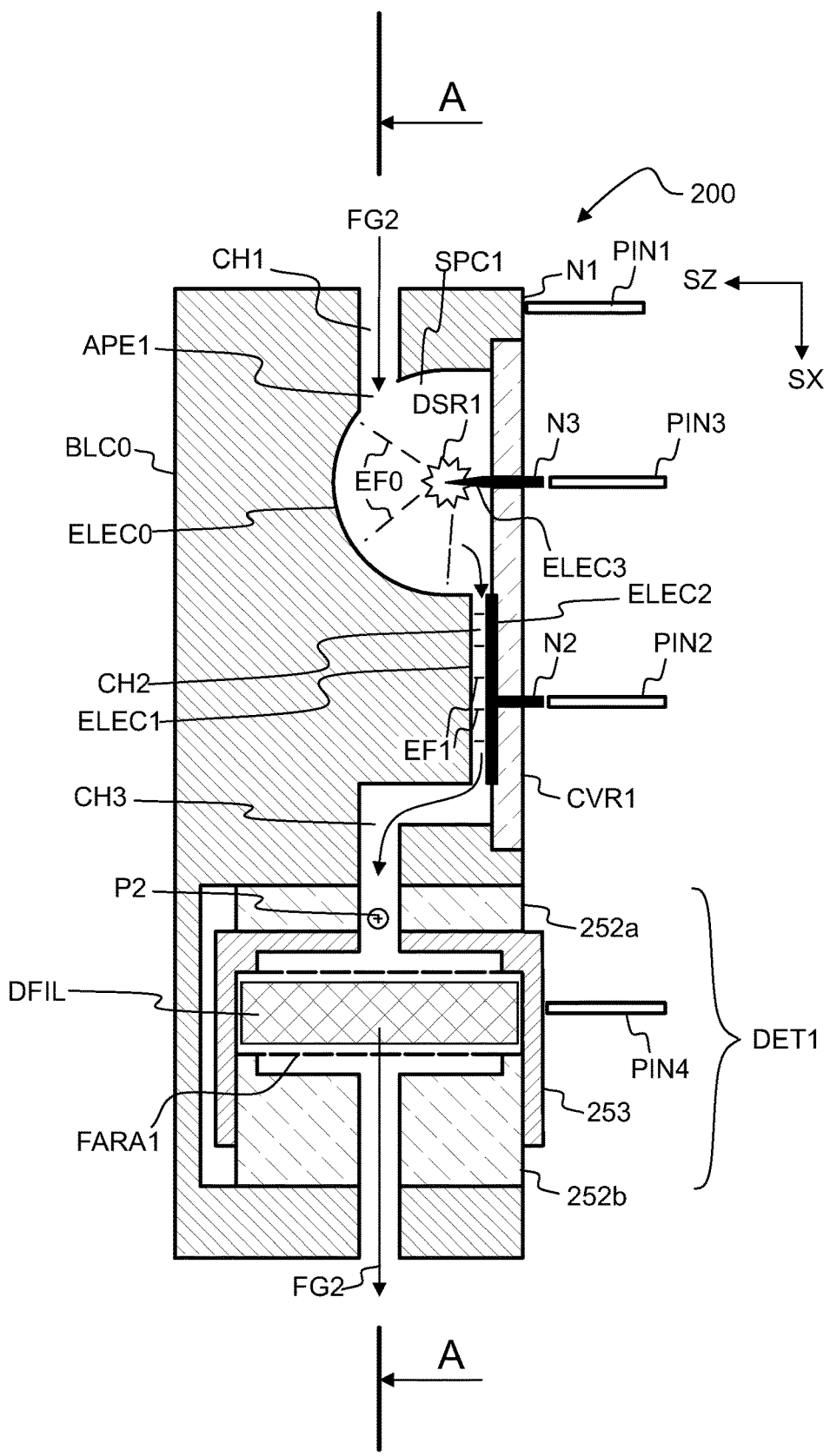
FIG. 4c shows, by way of example, in a cross-sectional view, the particle monitoring device.

FIG. 4b shows, in a three dimensional view, the hemispherical charging space SPC1 and the ion trap JTRAP1.

Figure 4D:
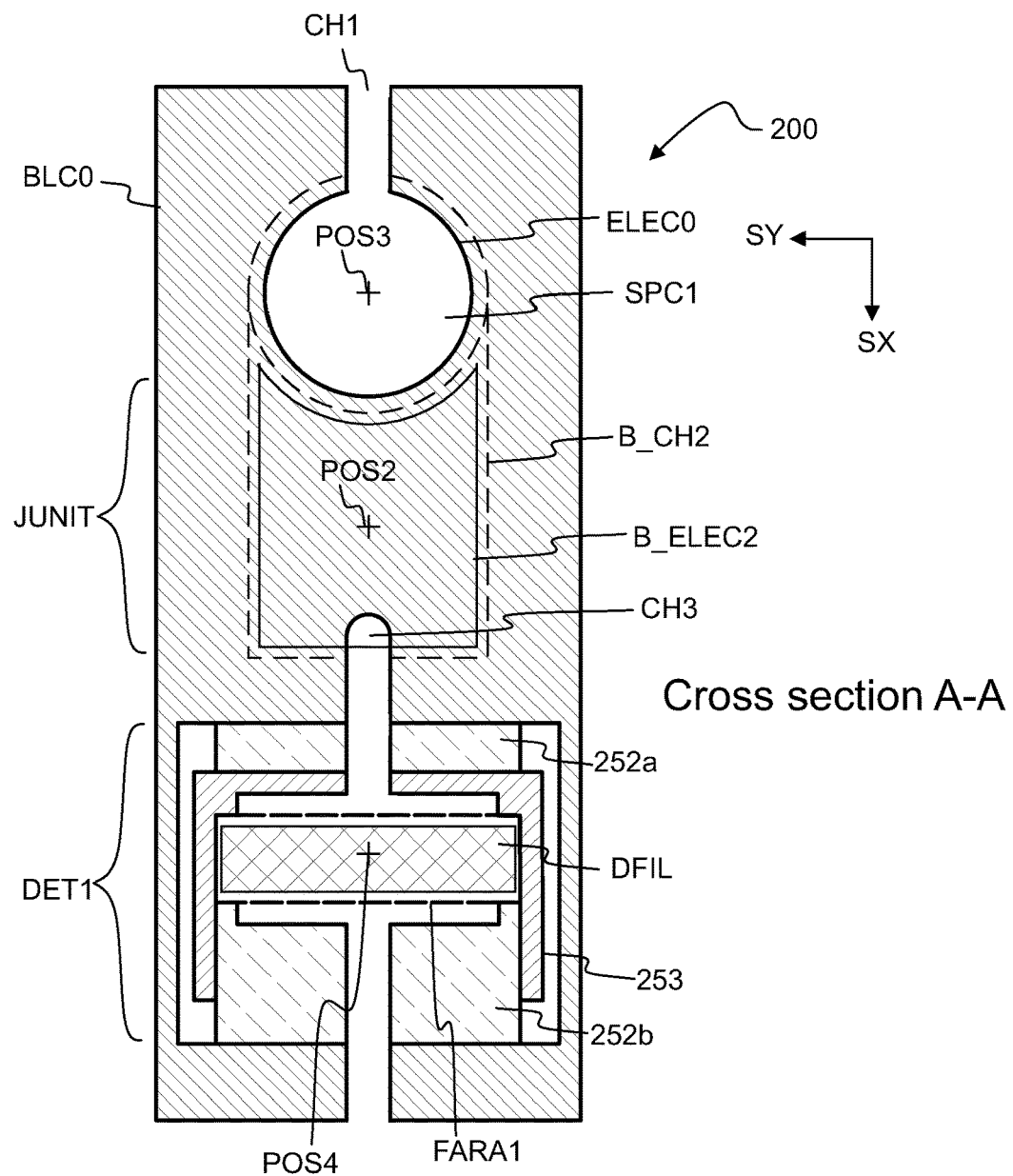
FIG. 4d shows, by way of example, a cross-section of the particle monitoring device shown in FIG. 4c.
Figure 4E:
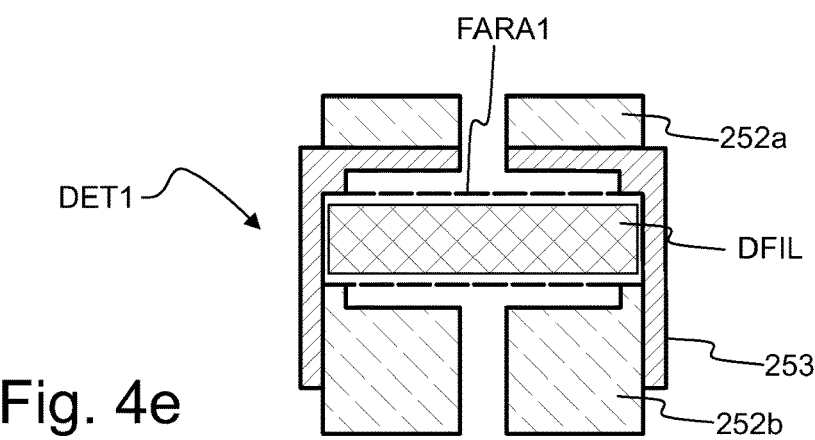
FIG. 4e shows, by way of example, in a cross-sectional view, a detector of the particle monitoring device.

Referring to FIGS. 4c and 4e, the particle detector DET1 may comprise a particle filter DFIL surrounded by a Faraday cage FARA1. The Faraday cage FARA1 may be supported by one or more electrical insulators 252a, 252b. The electrical insulators 252a, 252b may electrically insulate the Faraday cage FARA1 from the surrounding conductive structures. In particular, the electrical insulators 252a, 252b may electrically insulate the Faraday cage FARA1 from the conductive body BLC0. The one or more electrical insulators 252a, 252b may form a pressure-tight seal between the detector DET1 and the outlet channel CH3 of the ion trap JTRAP1. The detector DET1 may optionally comprise a conductive shell 253. The conductive shell 253 may form a part of the Faraday cage FARA1. The particle filter DFIL may be electrically insulating or electrically conductive. The particles P2 may be captured by the particle filter DFIL.

The particle monitoring apparatus 500 may comprise one or more connecting elements PIN1, PIN2, PIN3, PIN4 for forming a galvanic connection with the electrodes ELEC0, ELEC1, ELEC2, ELEC3, and the detector DET1. The element PIN1 may form a galvanic contact with the electrodes ELEC0 and ELEC1. The element PIN2 may form a galvanic contact with the electrode ELEC2. The element PIN3 may form a galvanic contact with the corona electrode ELEC3. The element PIN4 may form a galvanic contact with the Faraday cage FARA1 of the detector DET1. The element PIN1 may be arranged to contact the contact element N1. Also portion of the surface of the body BLC0 may operate as the contact element N1. The element PIN2 may be arranged to contact the contact element N2. The element PIN3 may be arranged to contact the contact element N3. The connecting element PIN4 may be arranged to contact the detector DET1. The connecting elements PIN2, PIN3, PIN4 may be e.g. spring-loaded conductive pins.

FIG. 4d shows a cross-section of the particle monitoring device 200 along the line A-A shown in FIG. 3a. POS3 denotes the position of the corona electrode ELEC3. POS2 denotes the position of a contact element N2. POS4 denotes the position of a connecting element PIN4. B_CH2 denotes the position of the flow channel CH2. B_ELEC2 denotes the position of the deflecting electrode ELEC2.

FIG. 5e shows a detector DET1 when it has been separated from the device 200. The detector DET1 may comprise e.g. a particle filter DFIL for capturing the charged particles P2. The filter DFIL may be electrically conductive or electrically insulating. The filter DFIL may be surrounded by a Faraday cage FARA1, or an electrically conductive outer layer of the filter DFIL may operate as the Faraday cage FARA1. An electrically conductive filter DFIL may comprise e.g. sintered conductive particles or conductive fibers. The Faraday cage FARA1 and/or the conductive filter DFIL may be galvanically connected to the current monitoring unit CMU1. The charge carried by charged particles P2 may be detected by using the Faraday cage FARA1 and the current monitoring unit CMU1 also in a situation where the charged particles P2 captured by the filter DFIL inside the Faraday cage FARA1 do not touch the Faraday cage FARA1.

The filter DFIL may collect particles irreversibly such that the particles are not released from the detector DET1 back into the gas flow. The detector DET1 may collect particles during the measurement period such that e.g. less than 10% of the mass of the collected particles is released from the detector DET1 back into to gas flow during the measurement period. Particles collected by the detector DET1 may eventually contaminate and/or block the detector DET1. If needed, the detector DET1 may be cleaned or replaced with a clean detector.

Figure 4F:
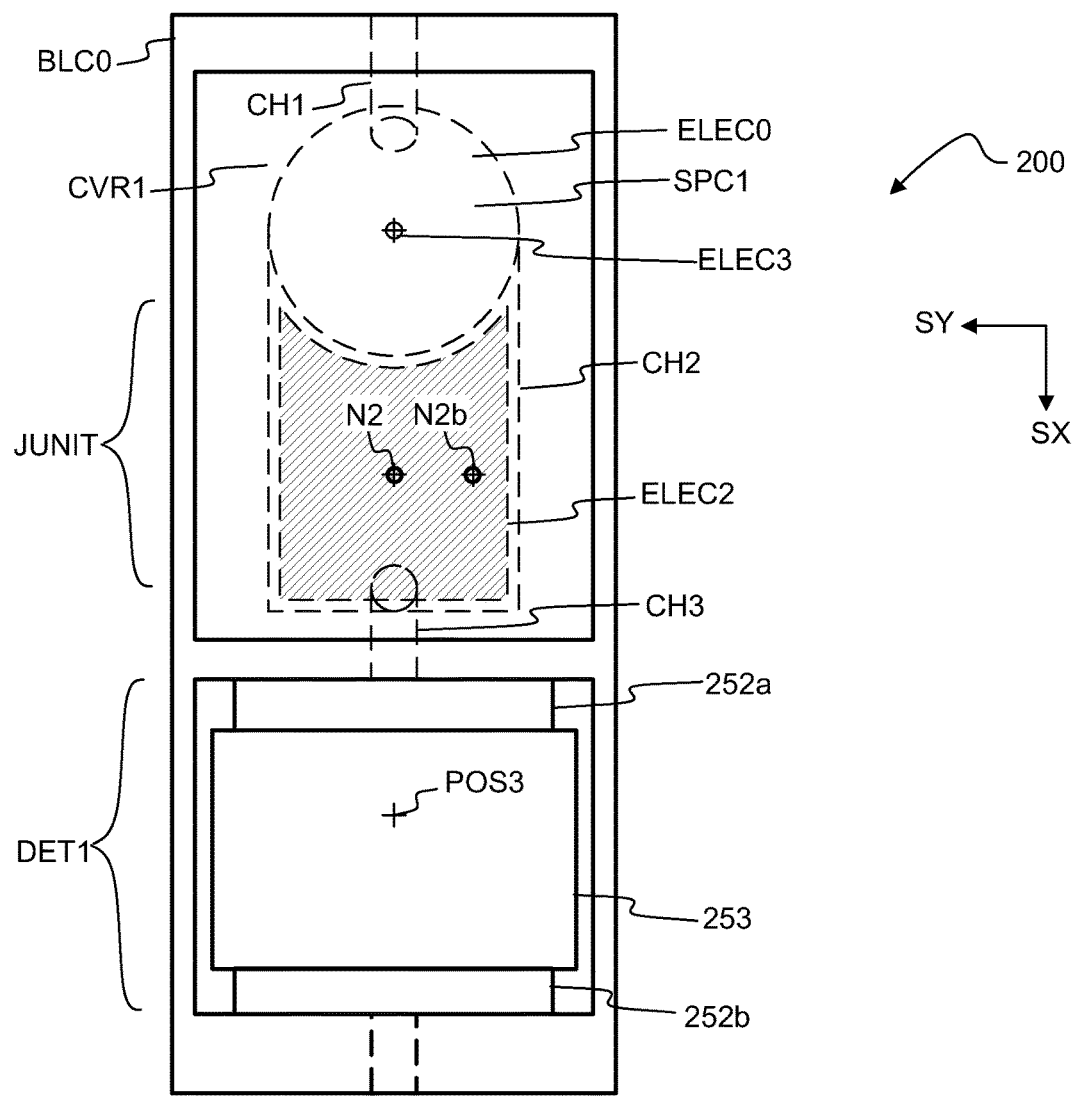
FIG. 4f shows, by way of example, a side view of the particle monitoring device shown in FIG. 4c.
Figure 4G:
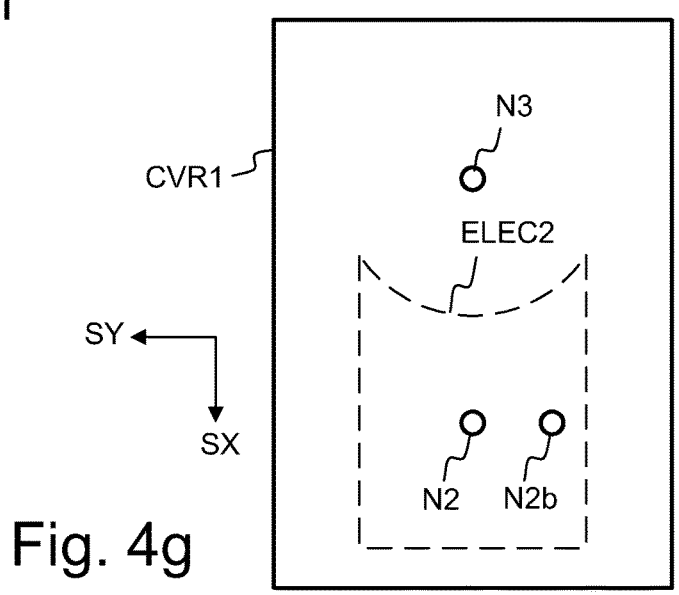
FIG. 4g shows, by way of example, a cover for the particle monitoring device shown in FIG. 4c.

FIG. 4f shows a side view of the particle monitoring device 200. The deflecting electrode ELEC2 may be located on the inner side of the cover CVR1. The deflecting voltage $U_2$ may be coupled to the electrode ELEC2 by using the contact element N2.

The monitoring device 200 may have a limited lifetime. The operating life of the monitoring device 200 may be limited e.g. due to contamination, due to particles captured by the detector DET1 and/or due to erosion of the corona electrode ELEC3. The monitoring device 200 may be a replaceable part of the apparatus 500. The monitoring device 200 may be removably attached e.g. to a frame so as to allow easy replacement of the monitoring device 200.

Figure 5:
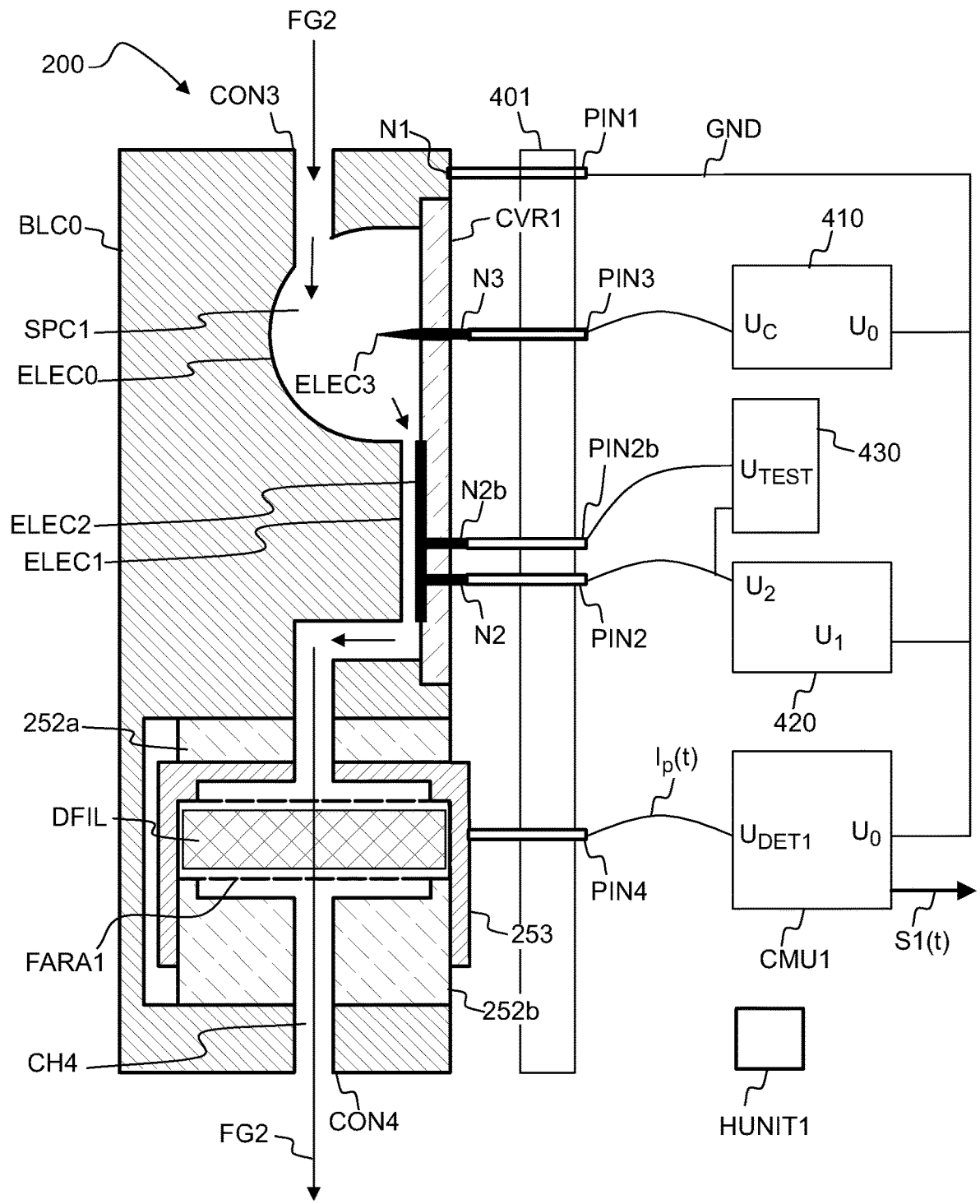
FIG. 5 shows, by way of example, electrical connections of the particle monitoring unit.

The apparatus 500 may optionally comprise a frame 401, which may also provide support for the connecting elements PIN1, PIN2, PIN3, PIN4 (see FIG. 5). The monitoring device 200 may be installed to the frame 401 such that electrical connections are formed between the electrodes ELEC2, ELEC3 and the connecting elements PIN2, PIN3. However, sometimes the connection between the elements N2 and PIN2 may fail. The particle monitoring device 200 may optionally comprise an auxiliary contact element N2$b$ for checking whether the device 200 is property installed to the frame 401. The contact element N2$b$ may be e.g. permanently connected to the element N2 or to the body BLC0.

FIG. 4$g$ shows the outer side of the cover CRV1. The deflecting electrode ELEC2 may have a curved edge so that the shape of the electrode ELEC2 may match with the shape of the hemispherical charging space SPC1. The radius of curvature of the edge of the electrode ELEC2 may be substantially equal to the radius $R_1$. The radius of curvature of the edge of the electrode ELEC2 may be e.g. In the range of 0.9 to 1.1 times the radius $R_1$. The curved edge may improve the efficiency of the ion trap JTRAP1, may stabilize operation of the ion trap JTRAP1, and/or may help to reduce the outer dimensions of the particle monitoring device 200. Alternatively, the deflecting electrode ELEC2 may have a straight input edge (see e.g. FIG. 4$b$).

Referring to FIG. 6, the particle monitoring device 200 may be electrically connected to a first voltage supply 410, to a second voltage supply 420, and to a current monitoring unit CMU1. The first voltage supply 410 may provide a voltage $U_C$, which may be applied to the corona electrode ELEC3 for generating the corona discharge. The first voltage supply 410 may provide a voltage $U_C$ with respect to the electrical ground GND. The electrical ground GND may have a voltage $U_0$. The counter electrode ELEC0 may be connected to the electrical ground GND. The body BLC0 may be connected to the electrical ground GND. The body BLC0 may be connected to the electrical ground GND e.g. by the connecting element PIN1.

The second voltage supply 420 may provide a voltage $U_1$ which may be applied to the first deflecting electrode ELEC1. The second voltage supply 420 may also provide a voltage $U_2$ which may be applied to the second deflecting electrode ELEC2. The voltage $U_1$ may be equal to the ground voltage $U_0$. The first deflecting electrode ELEC1 may be connected to the electrical ground GND e.g. via the conductive body BLC0.

The charge detector DET1 may provide an electric current $I_p(t)$, which is proportional to the charge of the charged particles captured by the detector DET1 per unit time. The detector DET1 may collect the charged particles P2 of the flow FG2. The instantaneous magnitude of the electric current $I_p(t)$ may be measured by the current monitoring unit CMU1. The current monitoring unit CMU1 may provide a monitor signal $S1(t)$, which is indicative of the electric current $I_p(t)$. The current monitoring unit CMU1 may provide a monitoring signal $S1(t)$ from the electric current $I_p(t)$. The monitoring signal $S1(t)$ may be substantially proportional to the electric current $I_p(t)$. The monitoring signal $S1(t)$ may be e.g. a digital signal or an analog signal. The monitoring signal $S1(t)$ may be indicative of the instantaneous concentration of particles P1 guided to the monitoring device 200. The current monitoring unit CMU1 may comprise e.g. an electrometer for measuring the current $I_p(t)$. The current monitoring unit CMU1 may be arranged to measure the electric current $I_p(t)$ conducted from the detector DET1 to an electrical ground GND of the monitoring device 200. The detector DET1 may be electrically insulated from an electrical ground GND of the monitoring device 200 such that the current monitoring unit CMU1 may measure the electric current $I_p(t)$ conducted from the detector DET1 to the electrical ground GND via the current monitoring unit CMU1.

The Faraday cage FARA1 of the detector DET1 may have a voltage $U_{DET1}$. The electrical ground GND may have a voltage $U_0$. The current monitoring unit CMU1 may be arranged to keep the voltage $U_0$, of the detector DET1 close to the voltage $U_0$ of the electrical ground GND. The voltage $U_{DET1}$ of the detector DET1 may be kept close to the voltage $U_0$ of the electrical ground GND during monitoring the electric current $I_p(t)$. The absolute value of the difference $(U_{DET1}-U_0)$ between the voltage $U_{DET1}$ of the detector DET1 and the voltage $U_0$ of the electrical ground may be e.g. smaller than 10 V.

The ion trap JTRAP1 may comprise two or more deflecting electrodes ELEC1, ELEC2. The first electrode ELEC1 may have a first voltage $U_1$, and the second electrode ELEC2 may have a second different voltage $U_2$. The electrodes ELEC1, ELEC2 may be coupled to a voltage difference $U_1-U_2$ in order to generate the electric field EF1. The magnitude of the electric field EF1 and/or the velocity of the gas flow may passing through the space the electrodes ELEC1, ELEC2 be selected such that a (first) suitable fraction of the charged particles P2 may pass through the ion trap JTRAP1 and such that a (second) suitable fraction of the ions J1 may be deflected away from the flow FG2. Thus, a large part of the charged particles P2 may pass through the ion trap JTRAP1 to the detector DET1. The lower cut-off size of particles which may pass through the ion trap may be selected by selecting the voltage difference $U_1-U_2$. The voltage $U_1$ and/or the voltage $U_2$ may be generated by a voltage supply 420.

The voltage $U_C$ may be connected to the contact element N3 e.g. via the connecting element PIN3. The voltage $U_2$ may be connected to the deflecting electrode ELEC2 e.g. via the connecting element PIN2. The electric current signal $I_p(t)$ may be coupled to the current monitoring unit CMU1 e.g. via the connecting element PIN4. The connecting element PIN4 may be arranged to touch e.g. the side of the conductive shell 253 of the detector DET1. The measuring apparatus 500 may comprise e.g. a latch mechanism to fasten the monitoring device 200 to the frame 401 of a measuring apparatus. The monitoring device 200 may be fastened to the frame 401 so as to form a releasable connection between the elements PIN1 and N1, to form a releasable connection between the elements PIN2 and N2, to form a releasable connection between the elements PIN3 and N3, and/or to form a releasable connection between the element PIN4 and the detector DET1. The device 200 may be disconnected from the elements PIN1, PIN2, PIN3, PIN4 by opening the latch mechanism and by moving the monitoring device 200 away from the frame 401. The frame 401 may provide support for the elements PIN1, PIN2, PIN3, and/or PIN4.

The measuring apparatus may optionally comprise a proximity sensing unit 430 for checking whether the monitoring device 200 is properly attached to the frame 401. The measuring apparatus may optionally comprise a proximity sensing unit 430 for checking whether the electrical resistance of the electrical connection between the elements PIN2 and N2 is lower than a predetermined limit. For example, the apparatus 500 may be arranged to prevent operation of the high voltage supply 410 when the device 200 is not properly attached to the frame 401.

The monitoring device 200 may comprise one or more auxiliary contact elements N2b for measuring the electrical resistance of a connection formed between a contact element N2 of the monitoring device 200 and a connecting element PIN2. The proximity sensing unit 430 may be arranged to detect the proximity of the monitoring device 200 e.g. based on a voltage of a connecting element PIN2b. The proximity sensing unit 430 may measure e.g. the voltage $U_{TEST}$ of the contact element PIN2b. The contact element PIN2b may be arranged to contact a contact element N2b. The contact element N2b may be in galvanic connection with the element N2. If the voltage $U_{TEST}$ is equal to the voltage $U_2$, this may indicate that the element PIN2 is properly connected to the contact element N2. If the voltage $U_{TEST}$ is different from the voltage $U_2$, this may indicate that the element PIN2 is not properly connected to the contact element N2.

The device 200 may comprise a contact element (N2) for forming an electrical contact between a voltage supply (420) and an electrode (ELEC2), wherein the device 200 may further comprise an auxiliary contact element (N2b) for checking whether a proper electrical connection is formed between said voltage supply and said electrode.

The method may comprise:
moving the monitoring device 200 away from the frame 401,
attaching the monitoring device 200 back to the frame 401, and
monitoring the voltage of an auxiliary connection element PIN2b in order to check whether a proper electrical connection is formed between a voltage supply and an electrode of the device 200.

The device 200 may optionally comprise a heating element HUNIT1 for heating the device 200 when the corona discharge DSR1 is not operating.

The device 200 may comprise a channel CH4 for guiding the particle-free gas flow FG2 from the detector DET1 to the pump PUMP2. The pump PUMP2 may be connected to the channel CH4 e.g. by a connector CON4.

The apparatus 500 may be used for checking the validity of a measurement result obtained by using an additional measuring instrument 100. For example, apparatus 500 may be used for checking the validity of a gravimetric measurement result obtained by using a filter FIL1. The gravimetric measurement result may mean the total mass $m_{tot}$ and/or the average concentration $C_{ave,tot}$ obtained by a gravimetric measurement. The total mass ma may be determined by weighing the filter FIL1 after a particle collecting period Tu. The average concentration $C_{ave,tot}$ may be subsequently calculated from the total mass mm. The monitoring device 200 may be used for checking the validity of the measured total mass $m_{tot}$ of particles. A measurement performed in certain operating conditions may be performed again if the validity check indicates that the measured total mass of particles is invalid.

Manual or automatic handling of the filter FIL1 may cause various types of measurement errors. The measured change of the weight of the filter FIL1 may be e.g. smaller or greater than the mass of particles actually collected by the filter FIL1. Checking the validity of gravimetric measurement results may improve the reliability and/or accuracy of an output result determined from one or more gravimetric measurement result. An output result may be obtained e.g. by averaging two or more valid gravimetric measurement results. An output result may be determined from one or more gravimetric measurement results by rejecting invalid gravimetric measurement results so that the invalid measurement results do not contribute to the output result. In particular, an output result may be determined from two or more gravimetric measurement results by rejecting one or more invalid measurement results so that the invalid measurement results do not contribute to the output result.

A particle emission experiment may involve running the aerosol particle source SRC1 according to a test sequence during several hours. The particle source SRC1 may be e.g. a combustion facility or an engine. Performing particle emission experiments may be expensive. A particle emission experiment may be interrupted if analysis of the monitor signal S1(t) indicates during the experiment that the experiment is likely to provide an invalid gravimetric measurement result. One or more additional experiments may be performed until at least one additional experiment provides a valid gravimetric measurement result.

The method may comprise:
collecting particles (P1) from the sampling point (POS0) to a filter (FIL1) during a first measurement time period ($T_{tot,1}$),
obtaining a first gravimetric measurement result ($m_{tot,1}$) by weighing the filter (FIL1) after the first measurement time period ($T_{tot,1}$),
measuring the electric current signal $I_p(t)$ during the first measurement time period ($T_{tot,1}$), and
classifying the first gravimetric measurement result ($m_{tot,1}$) as valid or invalid by analyzing the electric current signal $I_p(t)$ measured during the first measurement time period ($T_{tot,1}$).

Analysis of the electric current signal $I_p(t)$ may comprise e.g. determining whether the average or integral of the electric current signal $I_p(t)$ measured during the first time period ($T_{tot,1}$) corresponds to the first gravimetric measurement result ($m_{tot,1}$).

A first experiment may involve collecting the particles to a first filter FIL1 during the first measurement time period $T_{tot,1}$. A second experiment may involve collecting the particles to a second filter FIL2 during a second measurement time period $T_{tot,2}$, in order to obtain a second gravimetric measurement result $m_{tot,2}$. A first integral SUM1 may be obtained by integrating the electric current $I_p(t)$ over the first measurement time period $T_{tot,1}$. A second integral SUM2 may be obtained by integrating the electric current $I_p(t)$ over the second measurement time period $T_{tot,2}$. The method may comprise checking whether the ratio SUM1/SUM2 corresponds to the ratio $m_{tot,1}/m_{tot,2}$. The first result $m_{tot,1}$ and/or the second result $m_{tot,2}$ may be determined to be invalid e.g. if the following condition is not fulfilled:

$$0.8 < \frac{m_{tot,1}/m_{tot,2}}{SUM1/SUM2} < 1.2 \qquad (2)$$

The device 500 may be used for measuring particle emissions from a particle source SRC1. The particle source SRC1 may be operated according to first test procedure. The first test procedure may comprise e.g. adjusting a control signal of the facility (e.g. the fuel feed rate or operating temperature according to a predetermined sequence. The method may comprise obtaining a process indicator signal P(t) indicative of an operating parameter of the source SRC1. The operating parameter of the source SRC1 may be e.g. fuel feed rate, air flow rate, or output power. Analysis of the electric current signal $I_p(t)$ may comprise comparing the monitor signal S1(t) with a process indicator signal P(t). The process indicator signal P(t) may indicate an operating parameter of the particle source SRC. For example, the process indicator signal P(t) may be indicative of fuel flow rate, input air flow rate, operating temperature, operating temperature of a catalytic converter, operating temperature of a flue gas filter, operating temperature of a process, gas pedal setting, fuel feeding pressure, or flow rate of an additive.

The monitor signal S1(t) may be compared with the process indicator signal P(t) in order to determine whether a change of an operating parameter of the aerosol particle source SRC1 corresponds to a change of the monitor signal S1(t). The monitor signal S1(t) may be compared with the process indicator signal P(t) in order to determine whether a change of an operating parameter of the source SRC1 temporally coincides with a change of the monitor signal S1(t). The monitor signal S1(t) may be compared with the process indicator signal P(t) in order to determine whether the monitor signal S1(t) correlates with the process indicator signal P(t). The method may comprise calculating a cross-correlation between the electric current signal $I_p(t)$ and the first process indicator signal P(t), and checking whether the cross-correlation is higher than a predetermined value.

The method may comprise:
  operating a particle source SRC1 according to a first test procedure during a first test period $T_{tot,1}$,
  collecting particles P1 from the aerosol-laden gas PG0 provided by the source SRC1 to a first filter FIL1 during a first test period $T_{tot,1}$,
  obtaining a process indicator signal P(t) indicative of an operating parameter of the source SRC1, and
  determining whether the electric current signal $I_p(t)$ measured during the first test period $T_{tot,1}$ substantially corresponds to the process indicator signal P(t) obtained during the first test period $T_{tot,1}$.

Said determining may comprise e.g. checking whether a change of the electric current signal $I_p(t)$ temporally coincides with a change of the process indicator signal P(t).

Said determining may comprise e.g. checking whether at least one change of the electric current signal $I_p(t)$ temporally coincides with at least one change of the process indicator signal P(t).

Said determining may comprise e.g. calculating a cross correlation between the electric current signal $I_p(t)$ and the process indicator signal P(t).

A gravimetric measurement result ($m_{tot,1}$) may be determined to be invalid if the degree of correlation between the monitor signal S1(t) and the process indicator signal P(t) is below a predetermined limit.

Figure 6A:
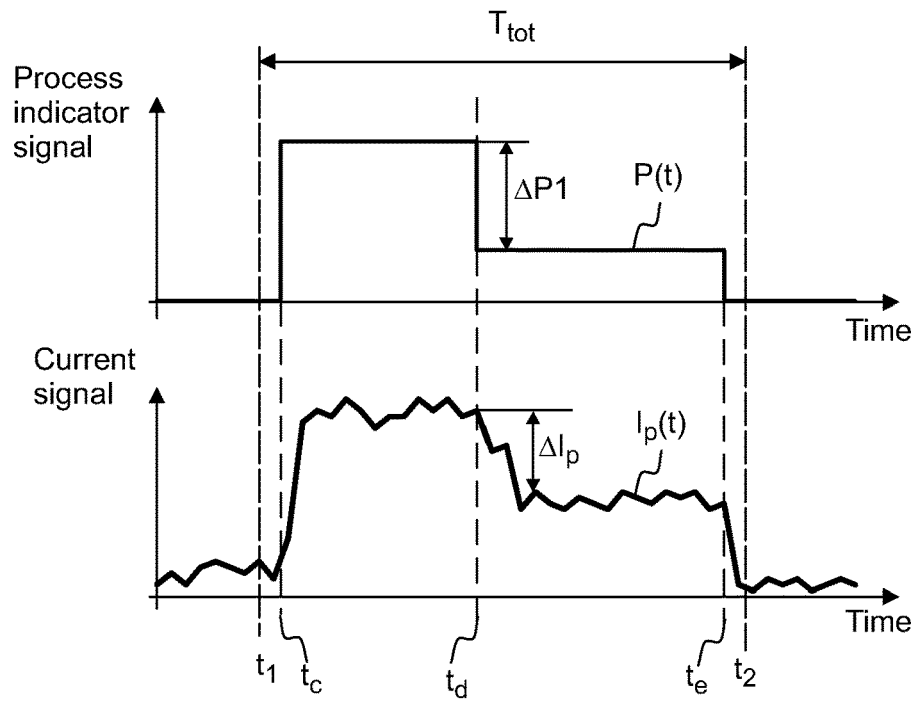
FIG. 6a shows, by way of example, a current signal which correlates with a process indicator signal.

FIG. 6a shows, by way of example, temporal evolution of a process indicator signal P(t) during an experiment, and the temporal evolution of the current signal $I_p(t)$ measured during said experiment. A particle collecting period $T_{tot}$ may start at the time $t_1$, and stop at the time $t_2$. The process indicator signal P(t) may exhibit a change ΔP1 at the time $t_d$. The process indicator signal P(t) may indicate e.g. the fuel feed rate, power or operating temperature of an combustion facility SRC1. The operation of the particle source SRC1 may be started e.g. at a time $t_c$, and stopped at the time $t_d$. The current signal may exhibit a change ΔI, which may temporally coincide with the change ΔP1 of the process indicator signal P(t). The current signal $I_p(t)$ may be determined to correlate with the process indicator signal P(t) in the example shown in FIG. 3a.

In an embodiment, one or more process indicator signals P(t) may indicate that the particle concentration should be substantially constant during the first measurement time period ($T_{tot,1}$). In that case, the gravimetric measurement result ($m_{tot,1}$) may be determined to be invalid if the current signal $I_p(t)$ exhibits significant deviations from the average value $I_{ave,1}$ of the current signal $I_p(t)$.

Figure 6B:
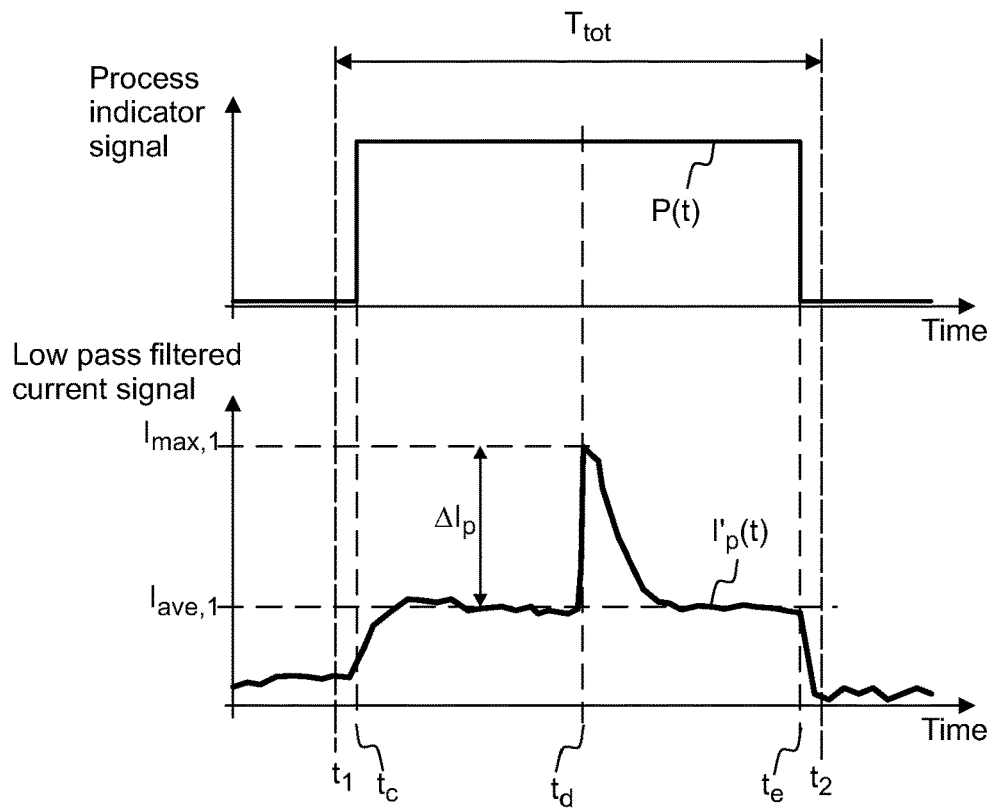
FIG. 6b shows, by way of example, a current signal, which exhibits anomalous behavior.

Referring to FIG. 6b, the symbol $I'_p(t)$ may denote a smoothed signal obtained by low-pass filtering the current signal $I_p(t)$. The smoothed signal $I'_p(t)$ may be formed from the current signal $I_p(t)$ e.g. by using a cut-off frequency 0.10 Hz. The smoothed signal $I'_p(t)$ may be formed from the current signal $I_p(t)$ such that the smoothed signal $I'_p(t)$ does not comprise spectral components whose frequency is lower than 0.1 Hz. $I_{ave,1}$ denotes the average value of the electric current signal $I_p(t)$ during a measurement time period ($T_{tot}$).

FIG. 6b shows, by way of example, a situation where low pass filtered current signal $I'_p(t)$ exhibits an anomalous change $\Delta I_p$, which does not correspond to the process indicator signal P(t). The anomalous change $\Delta I_p$ may take place at the time $t_d$. In this example, the process indicator signal P(t) may be substantially constant during the time period from a first time $t_c$ to a second time $t_e$. Said time period may comprise the time $t_d$. A gravimetric measurement result $m_{tot,1}$ may be obtained by collecting particles to a filter FIL1 during the time period from $t_1$ to $t_2$, and by weighing the filter FIL1. The result $m_{tot,1}$ may be determined to be valid e.g. if all significant changes ($\Delta I_p$) of the current signal $I_p(t)$ temporally coincide with changes of at least one process indicator signal obtained from the particle source SRC1. The result $m_{tot,1}$ may be determined to be invalid e.g. if all process indicator signals obtained from the particle source SRC1 are substantially constant during the time period which comprises the time $t_d$.

If the change $\Delta I_p$ does not correlate with any process indicator signal P(t), this may be an indication that the change $\Delta I_p$ is caused by a random event. The change $\Delta I_p$ may be caused e.g. when particles deposited on the surface of the gas duct DUC1 are suddenly released back to the flue gas flow PG0. Although the change $\Delta I_p$ may be caused by a true increase of the particle concentration, said change $\Delta I_p$ may be caused by a random event, which may lead to erroneous conclusions if the result $m_{tot,1}$ would be used e.g. as a data point for curve fitting. Analysis of the electric current $I_p(t)$ may indicate that an anomalous event has occurred. The apparatus 500 may be arranged to provide an indication to the user that an anomalous event has been detected.

The apparatus 500 may provide measurement data, which may be used for analysis of particle emission e.g. from an industrial process. The particle emission may be associated with serious economic and/or environmental consequences. One or more signals recorded in a memory of the apparatus 500 may be optionally protected against tampering and/or erasing. For example, the monitoring signal S1(t) recorded in the memory MEM1 may be protected against tampering and/or erasing. The signals recorded in the memory may be protected e.g. by one or more credentials provided by a user. The credentials may comprise e.g. a password, an RFID key, and/or a biometric indicator. RFID means radio frequency identification. The apparatus 500 may be arranged to operate such that altering or erasing the recorded data causes writing an additional record in a register of the apparatus. The additional record may comprise e.g. the time of altering the data and the identity of the user who altered the data. The identity of the user may be determined e.g. based on the password or RFID identification.

Further aspects are illustrated by the following examples.

Example 1. A particle measuring apparatus (200, 500), comprising:
- a charging unit (CUNIT1) to form charged particles (P2) from aerosol particles (P1) carried by an input flow (FG1), and
- a particle detector (DET1) to provide an electric current ($I_p(t)$) by collecting the charged particles (P2), wherein the charging unit (CUNIT1) in turn comprises:
- a counter-electrode (ELEC0) having a substantially hemispherical inner portion to define a charging space (SPC1),
- an inlet channel (CH1) for guiding aerosol particles (P1) into the charging space (SPC1),
- a corona electrode (ELEC3) to form charged particles (P2) from the aerosol particles (P1) by generating a in the charging space (SPC1), and
- an outlet channel (CH2) for guiding charged particles (P2) from the charging space (SPC1).

Example 2. The apparatus (200,500) of example 1 comprising an electrically insulating cover (CVR1), wherein the charging space (SPC1) is partly defined by a planar inner surface of the cover (CVR1).

Example 3. The apparatus (200,500) of example 2, wherein the corona electrode (ELEC3) Is supported by the electrically insulating cover (CVR1).

Example 4. The apparatus (200,500) according to any of the examples 1 to 3, wherein the corona electrode (ELEC3) has a tip to form the corona discharge (DSR1).

Example 5. The apparatus (200,500) according to any of the examples 1 to 4, comprising an ion trap (JTRAP) to remove ions (J) from the outlet channel (CH2), wherein the ion trap (JTRAP) comprises a first deflecting electrode (ELEC1) and a second deflecting electrode (ELEC2).

Example 6. The apparatus (200,500) of example 5, wherein the second deflecting electrode (ELEC1) is attached to the electrically insulating cover (CVR1) of the charging unit (CUNIT1).

Example 7. The apparatus (200,500) of example 5 or 6, wherein the counter-electrode (ELE0) is galvanically connected to the first deflecting electrode (ELEC1).

Example 8. The apparatus (200,500) according to any of the examples 1 to 7, comprising a current monitoring unit (CMU1) to measure the electric current ($I_p(t)$), and a heating element (HUNIT1) to heat the current monitoring unit (CMU1), and wherein the apparatus (200,500) is arranged to control the heating power of the heating element (HUNIT1) based on operation of the corona discharge (DSR1).

Example 9. The apparatus (500) according to any of the examples 1 to 9, wherein the apparatus (500) comprises:
- a voltage supply (420), and
- a proximity sensing unit (430) to monitor whether a proper electrical connection is formed between an electrode (ELEC2) of the apparatus (500) and the voltage supply (420).

Example 10. A charging unit (CUNIT1) for charging aerosol particles, the charging unit (CUNIT1) comprising:
- a counter-electrode (ELEC0) having a substantially hemispherical inner portion to define a charging space (SPC1),
- an inlet channel (CH1) for guiding aerosol particles (P1) into the charging space (SPC1),
- a corona electrode (ELEC3) to form charged particles (P2) from the aerosol particles (P1) by generating a corona discharge in the charging space (SPC1), and
- an outlet channel (CH2) for guiding charged particles (P2) from the charging space (SPC1).

Example 11. A method for charging particles, the method comprising:
- guiding aerosol particles (P1) into a charging space (SPC1) via an inlet channel (CH1),
- forming charged particles (P2) from the aerosol particles (P1) by generating the corona discharge (DSR1) in the charging space (SPC1),
- guiding the charged particles (P2) from the charging space (SPC1),
  - wherein the corona discharge (DSR1) is generated by a corona electrode (ELEC3) and a counter-electrode (ELEC0), and wherein the counter-electrode (ELEC0) has a substantially hemispherical inner portion to define the charging space (SPC1).

Example 12. A method for measuring aerosol particles (P1), the method comprising:
- guiding aerosol particles (P1) into a charging space (SPC1) via an inlet channel (CH1),
- forming charged particles (P2) from the aerosol particles (P1) by generating the corona discharge (DSR1) in the charging space (SPC1),
- guiding the charged particles (P2) from the charging space (SPC1) to a detector (DET1), and
- providing an electric current ($I_p(t)$) by collecting the charged particles (P2) by using the detector (DET1),
  - wherein the corona discharge (DSR1) is generated by a corona electrode (ELEC3) and a counter-electrode (ELEC0), and wherein the counter-electrode (ELEC0) has a substantially hemispherical inner portion to define the charging space (SPC1).

Example 13. The method of example 12 comprising controlling operation of a measuring instrument (100) based on the electric current ($I_p(t)$).

Example 14. The method of example 12 or 13 comprising:
- obtaining a measurement result by using a measuring instrument (100), and
- determining the validity of the measurement result by analyzing the electric current ($I_p(t)$).

Example 15. The method according to any of the examples 11 to 14, comprising providing the input flow (FG0) by sampling flue gas (PG0) of a combustion facility (SRC1), by sampling exhaust gas (PG0) of an engine, or by sampling from an ambient gas (PG0).

For the person skilled in the art, it will be clear that modifications and variations of the devices and the methods according to the present disclosure are perceivable. The figures are schematic. The particular embodiments described above with reference to the accompanying drawings are illustrative only and not meant to limit the scope of the invention, which is defined by the appended claims.

The invention claimed is:

1. A method for measuring aerosol particles, the method comprising:
- guiding aerosol particles into a charging space via an inlet channel,
- forming charged particles from the aerosol particles by generating a corona discharge in the charging space,
- guiding the charged particles from the charging space to a detector, and
- providing an electric current by collecting the charged particles by using the detector,
  - wherein a corona electrode and a counter-electrode together form an electric field, which generates the corona discharge, and wherein the counter-electrode has a substantially hemispherical inner portion to define the charging space, the method further comprising providing an input flow by sampling flue gas of a combustion facility, and guiding aerosol particles of the input flow into the charging space.

2. A method for measuring aerosol particles, the method comprising:

guiding aerosol particles into a charging space via an inlet channel, forming charged particles from the aerosol particles by generating a corona discharge in the charging space, guiding the charged particles from the charging space to a detector, and providing an electric current by collecting the charged particles by using the detector, wherein a corona electrode and a counter-electrode together form an electric field, which generates the corona discharge, and wherein the counter-electrode has a substantially hemispherical inner portion to define the charging space;

the method further comprising providing an input flow by sampling exhaust gas of an engine, and guiding aerosol particles of the input flow into the charging space.

3. A method for measuring aerosol particles, the method comprising:

guiding aerosol particles into a charging space via an inlet channel, forming charged particles from the aerosol particles by generating a corona discharge in the charging space, guiding the charged particles from the charging space to a detector, and providing an electric current by collecting the charged particles by using the detector, wherein a corona electrode and a counter-electrode together form an electric field, which generates the corona discharge, and wherein the counter-electrode has a substantially hemispherical inner portion to define the charging space;

the method further comprising providing an input flow by sampling from an ambient gas, and guiding aerosol particles of the input flow into the charging space.

* * * * *